US010602553B2

(12) United States Patent
Moosavi et al.

(10) Patent No.: US 10,602,553 B2
(45) Date of Patent: Mar. 24, 2020

(54) METHODS PROVIDING TIMER OPERATION AND RELATED WIRELESS DEVICES AND NETWORK NODES

(71) Applicant: Telefonaktiebolaget LM Ericsson (publ), Stockholm (SE)

(72) Inventors: Reza Moosavi, Linköping (SE); Icaro L. J. Da Silva, Solna (SE); Fredrik Gunnarsson, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/288,546

(22) Filed: Feb. 28, 2019

(65) Prior Publication Data
US 2019/0350018 A1 Nov. 14, 2019

Related U.S. Application Data

(63) Continuation of application No. PCT/EP2019/051099, filed on Jan. 17, 2019.

(60) Provisional application No. 62/668,743, filed on May 8, 2018.

(51) Int. Cl.
*H04W 76/11* (2018.01)
*H04W 76/15* (2018.01)
*H04W 76/18* (2018.01)
*H04W 24/10* (2009.01)

(52) U.S. Cl.
CPC ............ *H04W 76/11* (2018.02); *H04W 24/10* (2013.01); *H04W 76/15* (2018.02); *H04W 76/18* (2018.02)

(58) Field of Classification Search
None
See application file for complete search history.

(56) References Cited

U.S. PATENT DOCUMENTS 9,380,495 B2 * 6/2016 Lim ...................... H04W 48/20

FOREIGN PATENT DOCUMENTS

WO WO 2019/072902 4/2019

OTHER PUBLICATIONS

International Search Report and Written Opinion of the International Searching Authority, PCT/EP2019/051099, dated Apr. 30, 2019, 31 pages.
Vivo, ANR for EN-DC Standalone, 3GPP TSG-RAN WG2 Meeting#101bis, Sanya, China, Apr. 16-20, 2017, R2-1804595, 5 Pages.
Ericsson, Configuration of CGI Reporting, 3GPP TSG-RAN WG2 NE#101, Athens, Greece, Feb. 26-Mar. 2, 2018, Tdoc R2-1803333, 3 Pages.

(Continued)

*Primary Examiner* — Shripal K Khajuria
(74) *Attorney, Agent, or Firm* — Sage Patent Group

(57) ABSTRACT

According to some embodiments of inventive concepts, methods may be provided to operate a wireless terminal (UE) in a radio access network (RAN). A request to report a cell identifier of a neighbor cell may be received from the RAN, and a timer may be started responsive to receiving the request to report the cell identifier. System information may be obtained from the neighbor cell, with the system information indicating that the neighbor cell does not broadcast a cell identifier. The timer may be stopped before expiration of the timer responsive to obtaining the system information including the indication that the neighbor cell does not broadcast the cell identifier of the neighbor cell.

30 Claims, 17 Drawing Sheets

(56) References Cited

OTHER PUBLICATIONS

Huawei, Hisilicon, Automatic Neighbour Relation in NR, 3GPP TSG-RAN WG2#101, Athens, Greece, Feb. 26-Mar. 2, 2018, R2-1802804, 4 Pages.

Ericsson, TP on ANR to 38.300, 3GPP TSG-RAN WG2#101, Athens, Greece, Feb. 26-Mar. 2, 2018, R2-1803332, 5 Pages.

Vivo, Report of email discussion [101 bix#47][NR] ANR, 3GPP TSG-RAN WG2 Meeting #102, Busan, Korea, May 21-25, 2018, R2-1807626, 19 Pages.

Ericsson, [E255] Draft CR to 38.331 on corrections related to CGI reporting timer T321, 3GPP TSG-RAN WG2#103, Gothenburg, Sweden, Aug. 20-24, 2018, R2-1812187, 13 Pages.

$3^{rd}$ Generation Partnership Project, Technical Specification Group Radio Access Network, 3GPP TS 37.340, v15.1.0 (MAr. 2018), 52 Pages.

$3^{rd}$ Generation Partnership Project, Technical Specification Group Radio Access Network, Evolved Universal Terrestrial Radio Access (E-UTRA) and Evolved Universal Terrestrial Radio Access Network (U-TRAN), 3GPP Standard, 3GPP TS 36.300, v14.0.0, Sophia-Antipolis Cedex, France, Sep. 29, 2016, 314 Pages.

"Technical Specification Group Radio Access Network; Evolved Universal Terrestrial Radio Access (E-UTRA); Radio Resource Control (RRC); Protocol specification" (Release 15) 3GPP TS 36.331 V15.1.0 (Mar. 2018) 786 pages.

"Technical Specification Group Radio Access Network; NR; Base Station (BS) radio transmission and reception," (Release 15) 3GPP TS 38.104 V15.1.0 (Mar. 2018) 115 pages.

"Technical Specification Group Radio Access Network; NR; Radio Resource Control (RRC) protocol specification" (Release 15) 3GPP TS 38.331 V15.1.0 (Mar. 2018) 286 pages.

International Application No. PCT/EP2018/077572, Filed Oct. 10, 2018, 97 pages.

* cited by examiner

Dual Connectivity and Target Node CGI retrieval

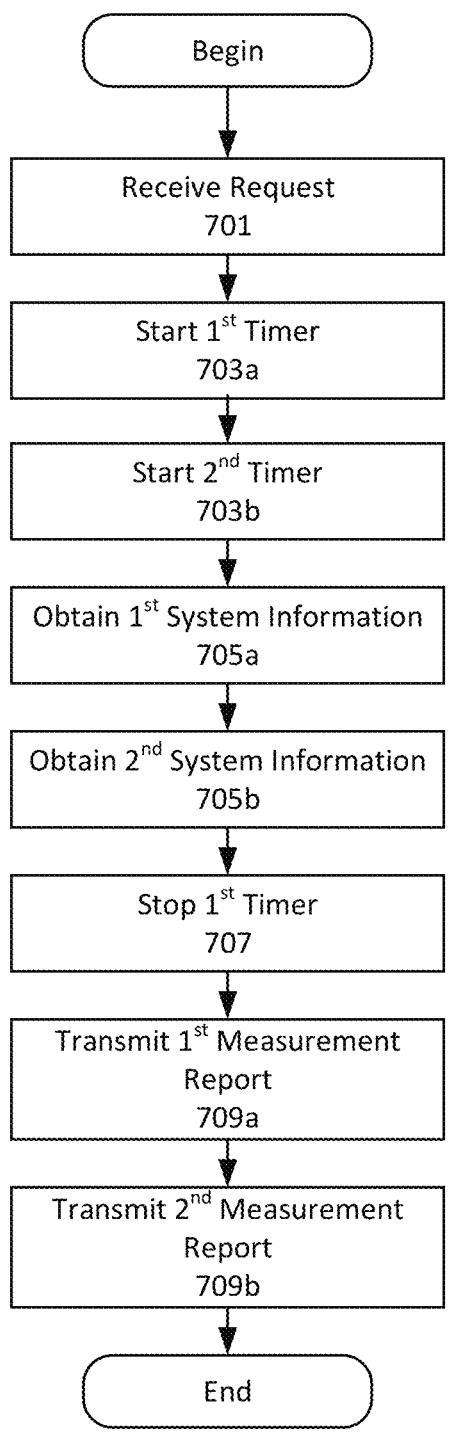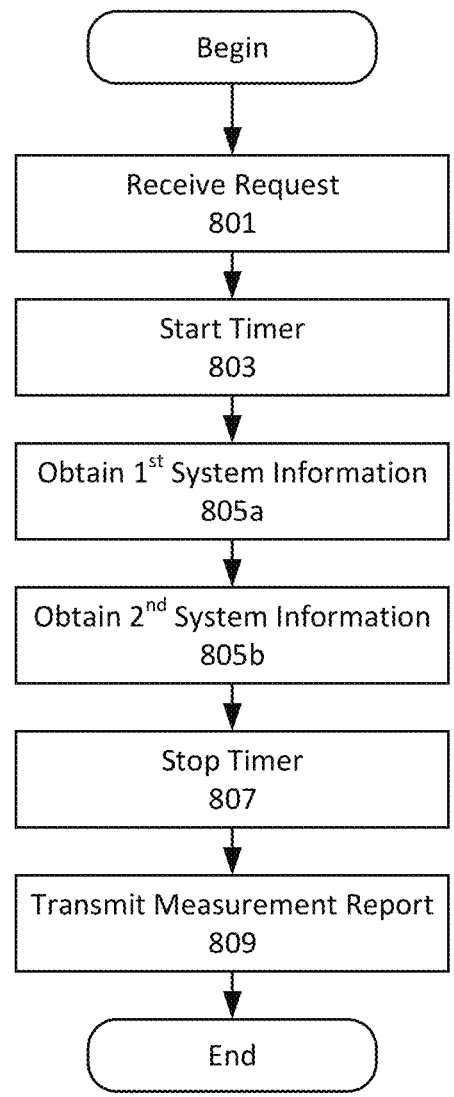

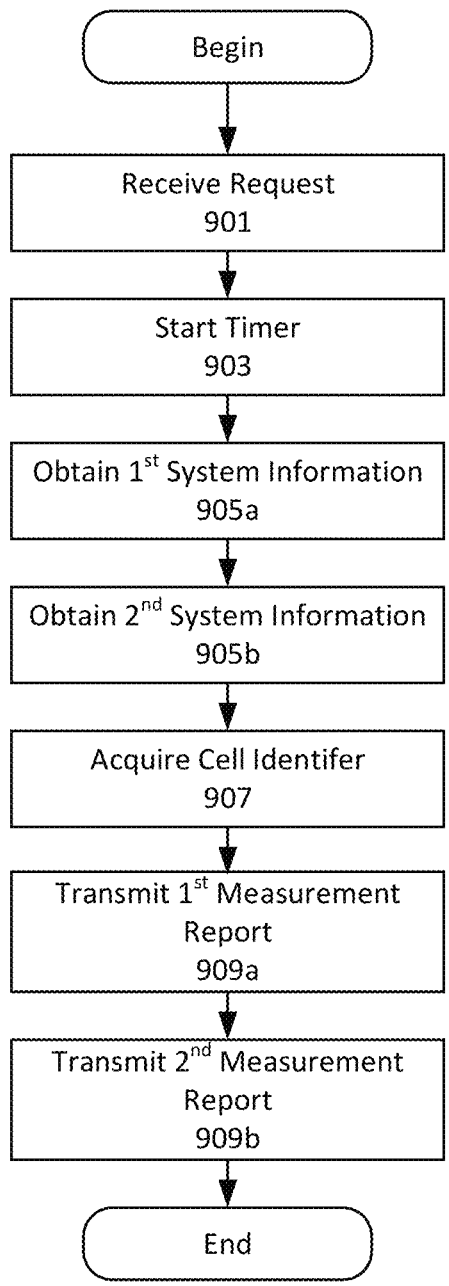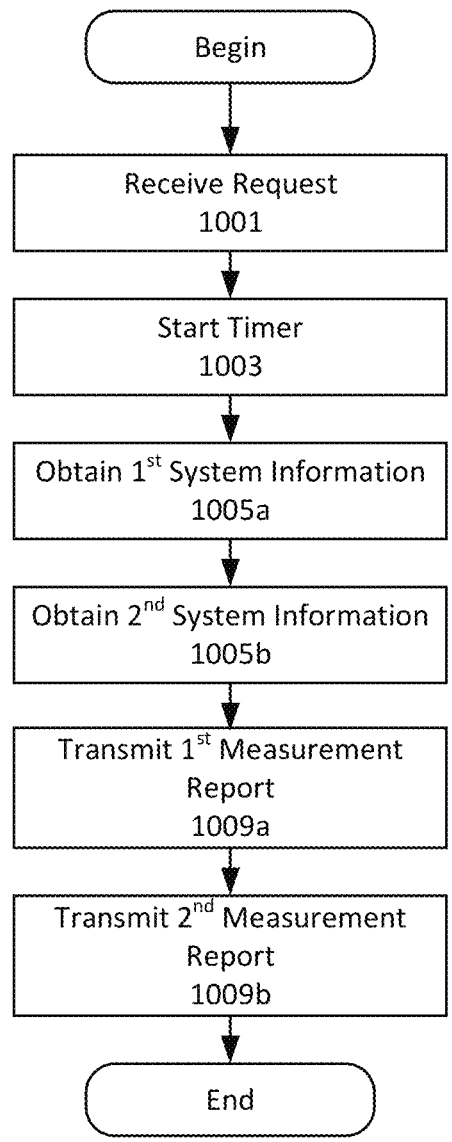

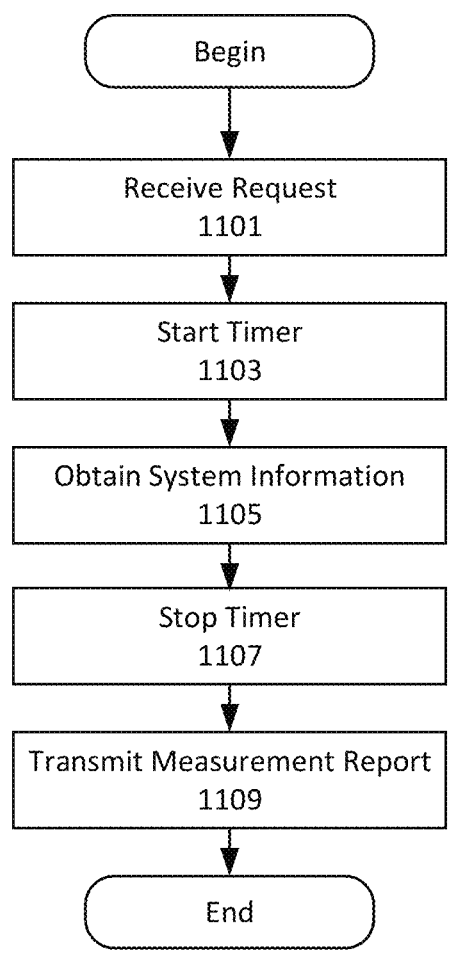

METHODS PROVIDING TIMER OPERATION AND RELATED WIRELESS DEVICES AND NETWORK NODES

RELATED APPLICATIONS

This application claims the benefit of priority as a by-pass continuation of PCT International Application No. PCT/EP2019/051099 filed on Jan. 17, 2019, which claims the benefit of priority of U.S. Provisional Application No. 62/668,743, filed May 8, 2018. The disclosure and content of both of the above referenced applications are hereby incorporated by reference herein in their entireties.

TECHNICAL FIELD

The present disclosure relates generally to communications, and more particularly, to wireless communications and related wireless devices and network nodes.

BACKGROUND

Since the first release of LTE, automatic neighbour relation (ANR) functionality has been introduced to automatically generate the relations between eNBs. Such relations are used to establish connections between eNBs, support mobility, load balancing, dual connectivity, etc., and hence, ANR may reduce planning and operation costs for operators.

In LTE, a user equipment (UE), also referred to as a wireless device, may detect cells based on their primary/secondary synchronization signals (PSS/SSS), which encode a physical cell identifier (PCI). A property of these signals is that the UE may autonomously detect neighbor cell IDs from an acquired PSS/SSS, i.e., the network does not need to provide a neighbor cell list. UEs may detect and measure neighbor cells by sampling a short time window (e.g., 5 ms) on the target frequency (which may be the same or different from serving) and search (possibly offline) for PSS/SSS occurrences within that sample. For each detected PSS/SSS, the UE can also perform a measurement using the cell reference signal (CRS) corresponding to the PCI. The result of that action is a list of neighbor cell identities and corresponding measurement samples.

Once the UE performs measurements, mobility events can trigger the transmission of measurement reports. Based on these reports, the serving base station eNB is able to identify that a given PCI belongs to a neighbour eNB in order to trigger a handover preparation procedure. In order to do that, the serving eNB may needs to maintain a neighbor relation table (NRT) that maps locally unique identifiers, i.e. the PCIs in LTE, with globally unique identifiers, i.e. the EUTRAN cell global identifier (E-CGI). E-CGI is defined in LTE as a combination of PLMN (Public Land Mobile Network) ID (e.g., a combination of country code and network code) and enhanced cell identity (ECI) (combination of eNB ID and cell ID).

Given the benefits of ANR in LTE, ANR may continue to be an important feature in next generation radio systems, denoted by NR. The challenging NR requirements may be expected to result in an even higher emphasis on seamless mobility than in legacy radio access technologies (RATs), which may further increase the importance of automatic relation establishment in NR. In fact, it has been agreed that ANR will be supported in NR, using LTE procedures as a baseline. Moreover, in RAN WG2 #98-Ad Hoc meeting, it has been agreed that the LTE inter-RAT ANR framework is extended to also cover NR.

A wireless terminal, however, may not be able to receive a CGI of a neighbor cell.

SUMMARY

According to some embodiments of inventive concepts, method may be provided to operate a wireless terminal (UE) in a radio access network (RAN). A request to report a cell identifier of a neighbor cell may be received from the RAN, and a timer may be started responsive to receiving the request to report the cell identifier. System information may be obtained from the neighbor cell, with the system information indicating that the neighbor cell does not broadcast a cell identifier. The timer may be stopped before expiration of the timer responsive to obtaining the system information including the indication that the neighbor cell does not broadcast the cell identifier of the neighbor cell.

According to some other embodiments of inventive concepts, methods may be provided to operate a wireless terminal (UE) in a radio access network (RAN). A request may be received from the RAN to report respective cell identifiers of first and second neighbor cells. First system information may be obtained from the first neighbor cell, with the first system information indicating that the neighbor cell does not broadcast a cell identifier. Second system information may be obtained from the second neighbor cell, with the second system information indicating that the second neighbor cell does broadcast a cell identifier. A first measurement report (also referred to as a cell identifier report) may be transmitted to the RAN responsive to obtaining the first system information indicating the that first neighbor cell does not broadcast a cell identifier, with the first measurement report indicating that the first neighbor cell does not broadcast a cell identifier. A second measurement report may be transmitted to the RAN responsive to obtaining the second system information indicating that the second neighbor cell does broadcast a cell identifier, with the second measurement report indicating that the second neighbor cell does broadcast a cell identifier.

According to still other embodiments of inventive concepts, methods may be provided to operate a wireless terminal (UE) in a radio access network (RAN). A request may be received from the RAN to report a cell identifier of a neighbor cell, and system information may be obtained from the neighbor cell, with the system information indicating that the neighbor cell does not broadcast a cell identifier. A measurement report (also referred to as a cell identifier report) may be transmitted to the RAN responsive to obtaining the system information indicating that the neighbor cell does not broadcast a cell identifier, with the measurement report indicating that the neighbor cell does not broadcast a cell identifier.

According to yet other embodiments of inventive concepts, a wireless terminal (UE) may include a transceiver and a processor coupled with the transceiver. The transceiver may be configured to provide wireless network communication with a radio access network (RAN), and the processor may be configured to provide wireless network communication through the transceiver. In addition, the processor may be configured to: receive from the RAN a request to report a cell identifier of a neighbor cell; start timer responsive to receiving the request to report the cell identifier; obtain system information from the neighbor cell, wherein the system information indicates that the neighbor cell does not broadcast a cell identifier; and stop the timer before expiration of the timer responsive to obtaining the system information including the indication that the neighbor cell does not broadcast a cell identifier of the neighbor cell.

According to further embodiments of inventive concepts, a wireless terminal (UE) may include a transceiver and a processor coupled with the transceiver. The transceiver may be configured to provide wireless network communication with a radio access network (RAN), and the processor may be configured to provide wireless network communication through the transceiver. In addition, the processor may be configured to: receive from the RAN a request to report respective cell identifiers of first and second neighbor cells; obtain first system information from the first neighbor cell, wherein the first system information indicates that the neighbor cell does not broadcast a cell identifier; obtain second system information from the second neighbor cell, wherein second system information indicates that the second neighbor cell does broadcast a cell identifier; transmit a first measurement report to the RAN responsive to obtaining the first system information indicating the that first neighbor cell does not broadcast a cell identifier, wherein the first measurement report indicates that the first neighbor cell does not broadcast a cell identifier; and transmit a second measurement report to the RAN responsive to obtaining the second system information indicating that the second neighbor cell does broadcast a cell identifier, wherein the second measurement report indicates that the second neighbor cell does broadcast a cell identifier.

According to more embodiments of inventive concepts, a wireless terminal (UE) may include a transceiver and a processor coupled with the transceiver. The transceiver may be configured to provide wireless network communication with a radio access network (RAN), and the processor may be configured to provide wireless network communication through the transceiver. In addition, the processor may be configured to: receive from the RAN a request to report a cell identifier of a neighbor cell; obtain system information from the neighbor cell, wherein the system information indicates that the neighbor cell does not broadcast a cell identifier; and transmit a measurement report to the RAN responsive to obtaining the system information indicating that the neighbor cell does not broadcast a cell identifier, wherein the measurement report indicates that the neighbor cell does not broadcast a cell identifier.

According to still further embodiments of inventive concepts, a computer program may include program code to be executed by at least one processor of a wireless terminal (UE). Execution of the program code may cause the wireless device to: receive from the RAN a request to report a cell identifier of a neighbor cell; start timer responsive to receiving the request to report the cell identifier; obtain system information from the neighbor cell, wherein the system information indicates that the neighbor cell does not broadcast a cell identifier; and stop the timer before expiration of the timer responsive to obtaining the system information including the indication that the neighbor cell does not broadcast a cell identifier of the neighbor cell.

According to still further embodiments of inventive concepts, a computer program may include program code to be executed by at least one processor of a wireless terminal (UE). Execution of the program code may cause the wireless device to: receive from the RAN a request to report respective cell identifiers of first and second neighbor cells; obtain first system information from the first neighbor cell, wherein the first system information indicates that the neighbor cell does not broadcast a cell identifier; obtain second system information from the second neighbor cell, wherein second system information indicates that the second neighbor cell does broadcast a cell identifier; transmit a first measurement report to the RAN responsive to obtaining the first system information indicating the that first neighbor cell does not broadcast a cell identifier, wherein the first measurement report indicates that the first neighbor cell does not broadcast a cell identifier; and transmit a second measurement report to the RAN responsive to obtaining the second system information indicating that the second neighbor cell does broadcast a cell identifier, wherein the second measurement report indicates that the second neighbor cell does broadcast a cell identifier.

According to still further embodiments of inventive concepts, a computer program may include program code to be executed by at least one processor of a wireless terminal (UE). Execution of the program code may cause the wireless device to: receive from the RAN a request to report a cell identifier of a neighbor cell; obtain system information from the neighbor cell, wherein the system information indicates that the neighbor cell does not broadcast a cell identifier; and transmit a measurement report to the RAN responsive to obtaining the system information indicating that the neighbor cell does not broadcast a cell identifier, wherein the measurement report indicates that the neighbor cell does not broadcast a cell identifier.

According to some embodiments of inventive concepts, unnecessary delay at the wireless terminal may be reduced when a cell does not broadcast a cell identifier.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 5-11 are flow charts illustrating operations of wireless terminals according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
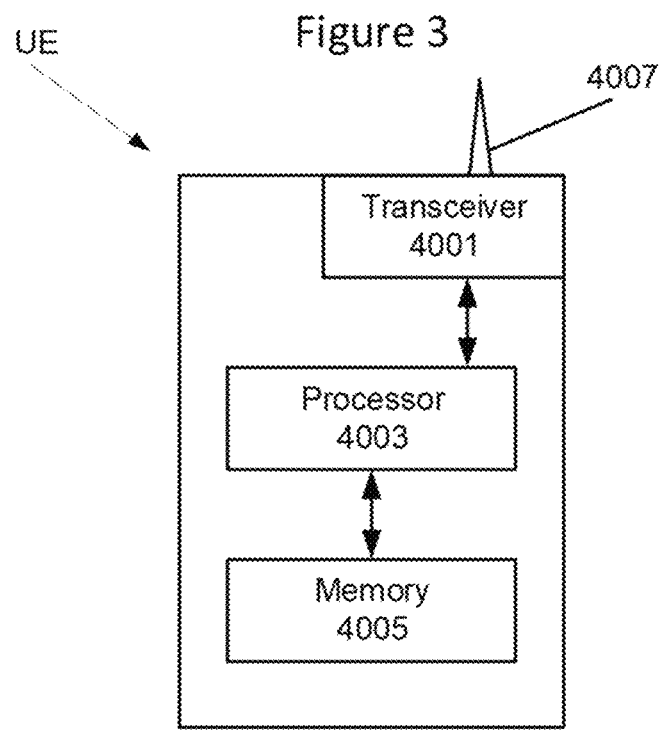
FIG. 3 is a block diagram illustrating a wireless device UE according to some embodiments of inventive concepts.

FIG. 3 is a block diagram illustrating elements of a wireless terminal UE (also referred to as a wireless device, a wireless communication device, a wireless communication terminal, user equipment, UE, a user equipment node/terminal/device, etc.) configured to provide wireless communication according to embodiments of inventive concepts. As shown, wireless terminal UE may include an antenna 4007, and a transceiver circuit 4001 (also referred to as a transceiver) including a transmitter and a receiver configured to provide uplink and downlink radio communications with a base station eNB/gNB of a wireless communication network (also referred to as a radio access network RAN). Wireless terminal UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. Wireless terminal UE may also include an interface (such as a user interface) coupled with processor 4003, and/or wireless terminal UE may be an IoT and/or MTC device.

As discussed herein, operations of wireless terminal UE may be performed by processor 4003 and/or transceiver 4001. For example, processor 4003 may control transceiver 4001 to transmit uplink communications through transceiver 4001 over a radio interface to a base station eNB of a wireless communication network and/or to receive downlink communications through transceiver 4001 from a base station eNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 4:
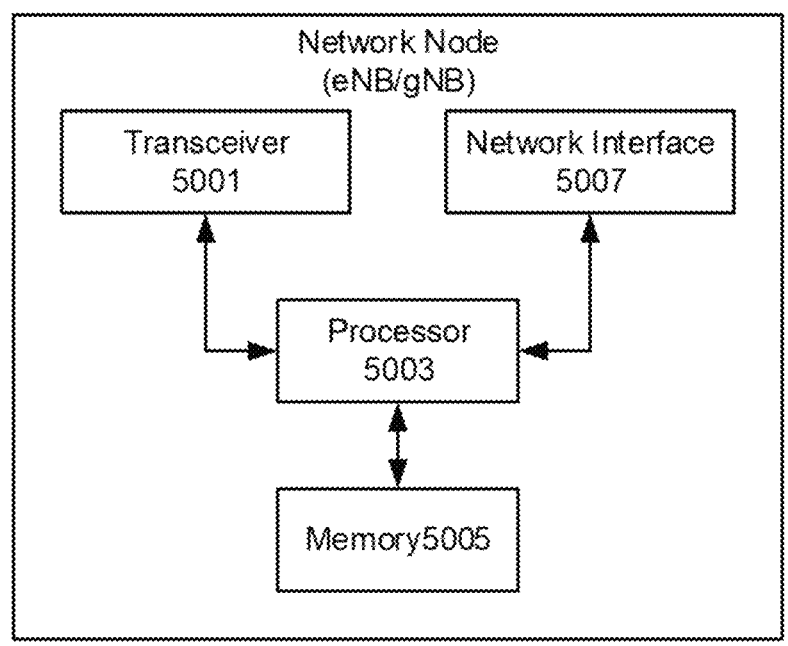
FIG. 4 is a block diagram illustrating a network node (base station) eNB/gNB according to some embodiments of inventive concepts.

FIG. 4 is a block diagram illustrating elements of a node (also referred to as a network node, base station, eNB, eNodeB, etc.) of a wireless communication network (also referred to as a Radio Access Network RAN) configured to provide cellular communication according to embodiments of inventive concepts. As shown, the network node may include a transceiver circuit 5001 (also referred to as a transceiver) including a transmitter and a receiver configured to provide uplink and downlink radio communications with wireless devices. The network node may include a network interface circuit 5007 (also referred to as a network interface) configured to provide communications with other nodes (e.g., with other base stations and/or core network nodes) of the RAN. The network node may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the network node may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments).

Figure 1:
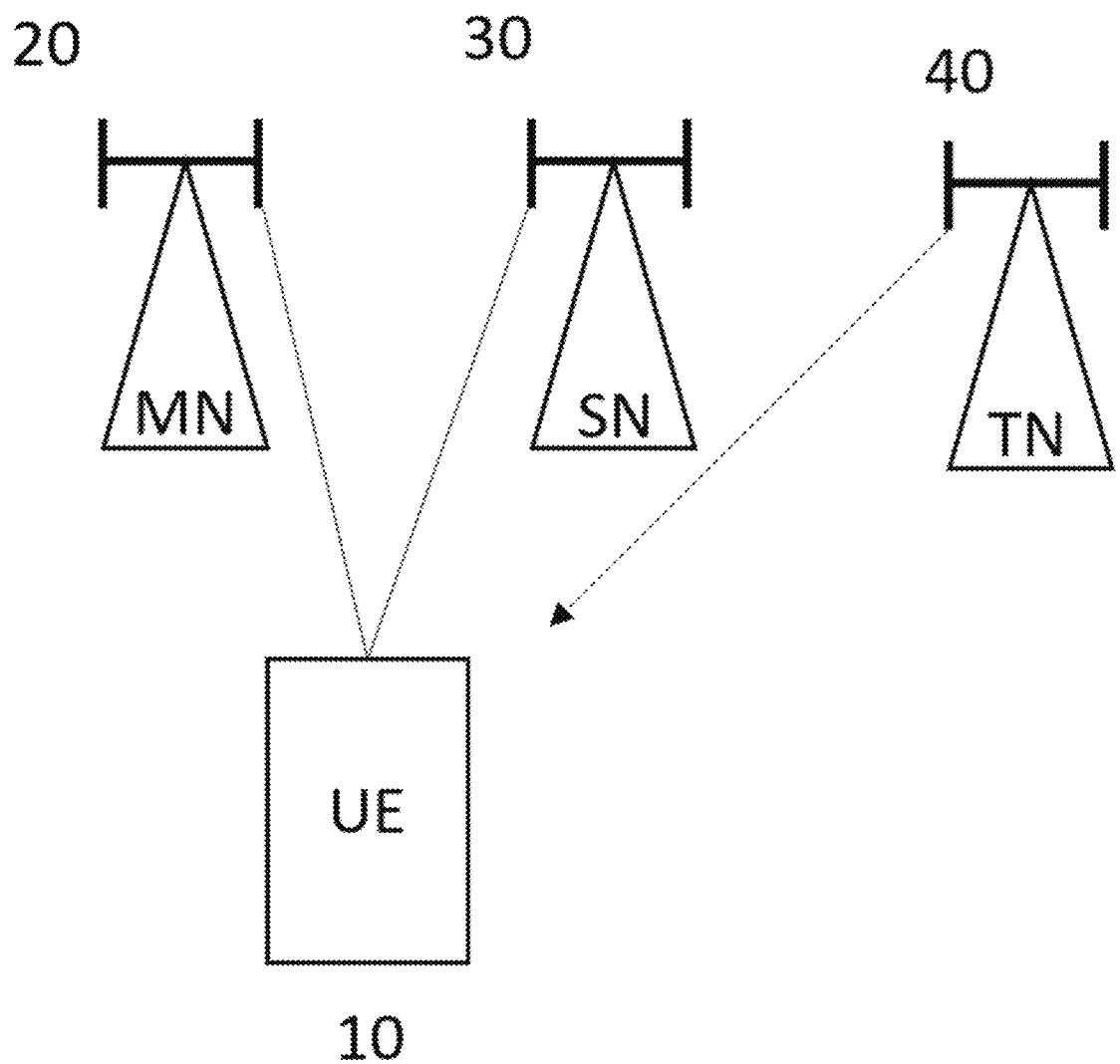
FIG. 1 illustrates dual connectivity and target node CGI retrieval.
Figure 2A:
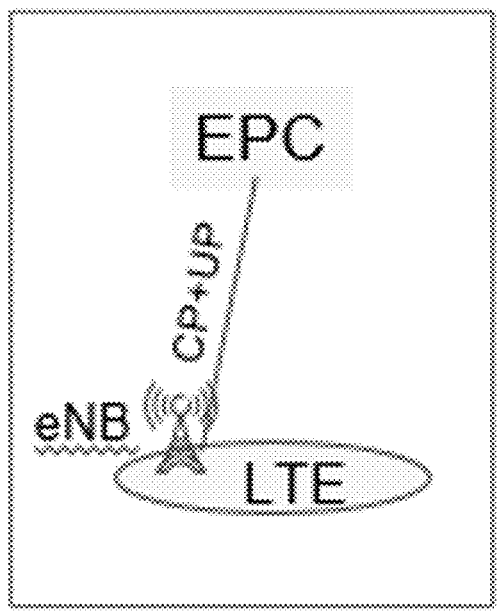
FIGS. 2A-E illustrate examples of LTE and NR interworking.
Figure 2B:
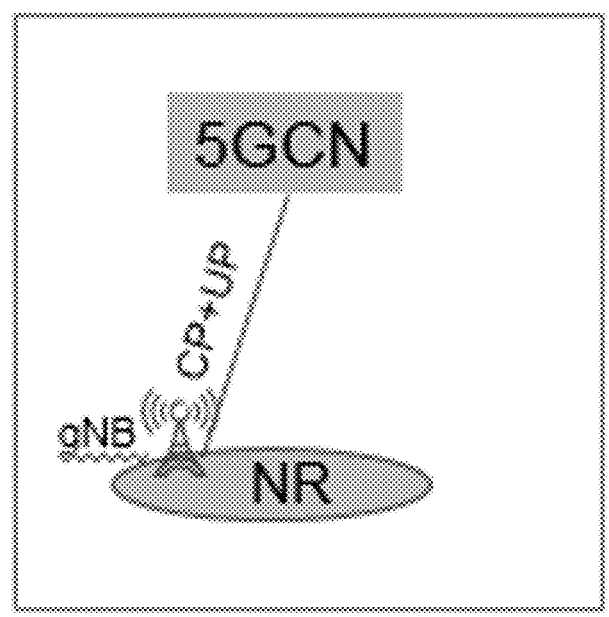
Figure 2C:
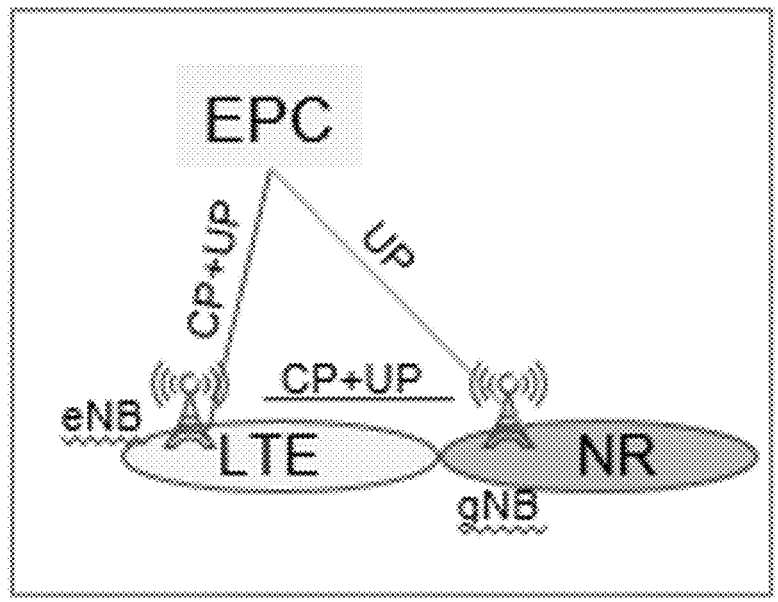
Figure 2D:
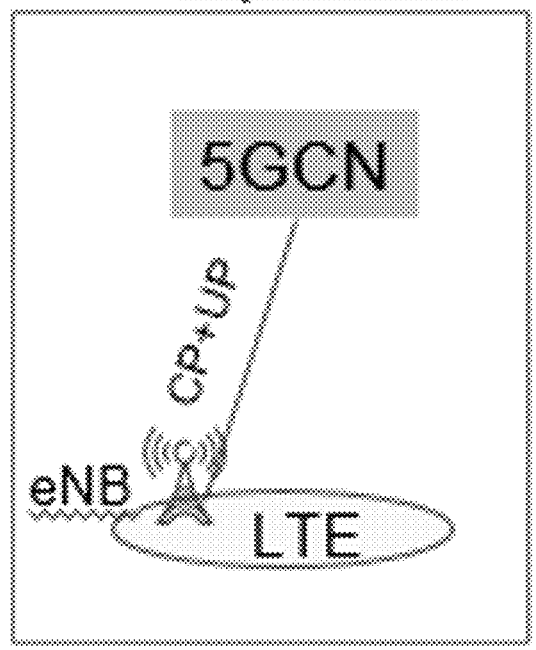
Figure 2E:
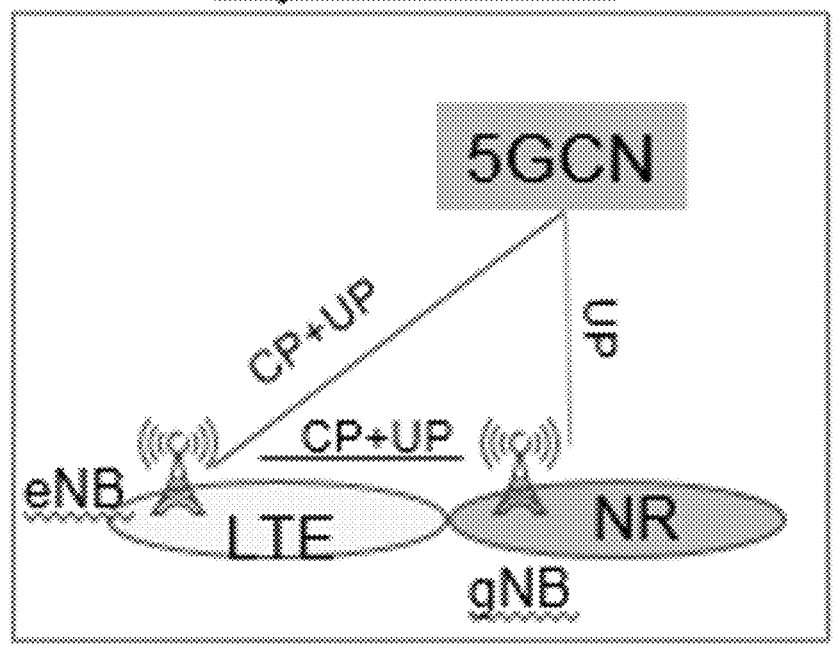

As discussed above, CGI reporting is part of ANR functionality, where the UE is requested to read a neighbor cell's system information (including global cell identity) to assist the base station eNB/gNB to build neighbor relation information. CGI measurement may be requested when the UE has reported an unknown PCI (i.e., an unknown neighbor cell) to the source node (base station) managing the connection. PCI information may be included in all the UE measurement reports which may have been initiated for different purposes. When the eNB/gNB has required information about a neighbor cell, this information is stored, and it is used to setup X2/Xn connection between the nodes, which as discussed above, may be used for several different procedures, such as handover, dual connectivity setup, etc. As illustrated in FIG. 1, the UE (10) can be connected to a master node (MN, 20), and optionally one more secondary nodes (SN, 30) in case of dual/multiple connectivity, while retrieving the CGI of a target node (TN, 40).

In LTE, the UE upon receiving a measurement configuration including a reportConfig with the purpose set to reportCGI, the UE starts a timer denoted by T321 and tries to acquire CGI info of the requested cell. If the UE succeeds while the timer T321 is running, the UE includes CGI info in the reportCGI message (which is a measurement report) and sends it to network (NW). On the other hand, if the UE fails to detect the CGI, upon the expiry of T321, the UE sends reportCGI message (which is a measurement report) with empty CGI info field. In LTE, T321 is pre-configured in the specification 36.331.

In the Radio Resource Control RRC specifications of LTE (36.331), the existing handling of T321 timer is summarized as follows:

| T321 | Upon receiving measConfig including a reportConfig with the purpose set to reportCGI | Upon acquiring the information needed to set all fields of cellGlobalId for the requested cell, upon receiving measConfig that includes removal of the reportConfig with the purpose set to reportCGI | Initiate the measurement reporting procedure, stop performing the related measurements and remove the corresponding measId |
|---|---|---|---|

2> if the purpose is included and set to reportCGI and if the UE acquired the information needed to set all fields of cgi-Info for the requested cell:
  3> include a measurement reporting entry within the VarMeasReportList for this measId;
  3> set the numberOfReportsSent defined within the VarMeasReportList for this measId to 0;
  3> stop timer T321;
  3> initiate the measurement reporting procedure, as specified in 5.5.5;
2> upon expiry of the T321 for this measId:
  3> include a measurement reporting entry within the VarMeasReportList for this measId;
  3> set the numberOfReportsSent defined within the VarMeasReportList for this measId to 0;
  3> initiate the measurement reporting procedure, as specified in 5.5.5;

There may be different ways to deploy a 5G network with or without interworking with existing LTE and evolved packet core (EPC). Some of these options are depicted in FIGS. 2A-E. In FIG. 1C, the first version to be supported in referred to as "option 3" which is referred to as EN-DC (EUTRAN-NR Dual Connectivity). In such a deployment, dual connectivity between NR and LTE is applied where an LTE base station eNB is a master node and an NR base station gNB is secondary node. The RAN node (gNB) supporting NR, may not have a control plane connection to core network (EPC), and instead it may rely on the LTE node eNB as master node (MeNB). This is also referred to as non-standalone (NSA) NR and there may be no SGCN in this deployment. In this case, the functionality of an NR cell may be limited to be used for connected mode UEs as a booster and/or diversity leg, but a UE may not camp on these NR cells.

With introduction of 5G core network (SGCN), other options may be also valid. For example, option 2 of FIG. 2B may support stand-alone (SA) NR deployment where a 5G base station gNB is connected to SGCN. Similarly, an LTE base station eNB can also be connected to SGCN using option 5 of FIG. 2D. In these cases, both NR and LTE are seen as part of the NG-RAN which are connected to SGCN.

NR is designed to allow deployment in low frequency ranges FR1 as well as high frequency ranges FR2. 3GPP Rel 15 NR (38.104, section 5.2) is supported in the two frequency ranges FR1 (450 MHz-6 GHz) and FR2 (24.25 GHz-52.6 GHz).

In LTE, the UE can be configured with a PCI for CGI reporting purposes, as discussed above. Then, for that PCI, the UE may need to read system information to acquire the associated CGI. In LTE, the timer T321 is started when the UE is configured to acquire a CGI associated with a configured PCI (associated with a measurement object). Then, the timer T321 may be stopped in the following cases:
  When a measId/measObject or reportConfig associated to a given reportCGI is removed, added or modified;
  When upon being configured to acquire CGI for a given cell, the UE successfully acquires information needed to set the CGI information in the associated measurement report (successful acquisition of system information)

However, the second stopping criterion for timer T321, assumes that there is always system information associated with a given PCI, while the non-possibility to acquire the CGI is associated with problems e.g. limited coverage, etc. However, in NR, that may not always be the case as in NR there is the possibility that an NR cell does not provide SIB1 (System Information Block 1) transmission (or equivalent System Information Block SIB containing the information needed for CGI reporting). To help UEs realizing the absence of SIB1 transmission and possibly avoid wasting time and energy to acquire something that does not exist, this information is broadcasted in MIB. More particularly, it has been agreed in RAN2 #100 to make the pdcch-ConfigSIB1 information element (IE) in MIB a mandatory field and assign/define one code-point (e.g., all-zeros) as "SIB1 not present". This way, the UE by decoding MIB content, may know if SIB1 (including CGI) will be transmitted or not. That is encoded in the current specifications (38.331 v15.1.0) as follows:

```
6.2.2       Message definitions
2.2.1.1 -      MIB
               The MIB includes the system information transmitted on BCH.
               Signalling radio bearer: N/A
               RLC-SAP: TM
               Logical channel: BCCH
               Direction: Network to UE
                                MIB
-- ASN1START
-- TAG-MIB-START
MIB ::= SEQUENCE {
    -- The 6 most significant bit (MSB) of the 10 bit System Frame Number. The 4 LSB of
the SFN are conveyed in the PBCH transport block
    -- as well but outside the MIB.
    systemFrameNumber            BITSTRING (SIZE (6)),
    -- Subcarrier spacing for SIB1, Msg.2/4 for initial access and broadcast SI-messages.
    -- If the UE acquires this MIB on a carrier frequency <6GHz, the values 15 and 30 kHz
are applicable.
    -- If the UE acquires this MIB on a carrier frequency >6GHz,the values 60 and 120
kHz are applicable.
    subCarrierSpacingCommon      ENUMERATED {scs15or60,
scs30or120},
    -- The frequency domain offset between SSB and the overall resource block grid in
number of subcarriers. (See 38.211, section 7.4.3.1)
    -- Note: For frequencies <6 GHz a fifth, this field may comprise only the 4 least
significant bits of the ssb-SubcarrierOffset.
    -- The codepoint "FFS_RAN1" indicates that this cell does not provide SIB1 and that
there is hence no common CORESET.
    ssb-SubcarrierOffset         INTEGER (0..15),
    -- Position of (first) DL DM-RS. Corresponds to L1 parameter 'DL-DMRS-typeA-pos'
(see 38.211, section 7.4.1.1.1)
    dmrs-TypeA-Position          ENUMERATED {pos2, pos3},
    -- Determines a bandwidth for PDCCH/SIB, a common ControlResourceSet
(CORESET) a common search space and necessary PDCCH parameters.
    -- Corresponds to L1 parameter 'RMSI-PDCCH-Config' (see FFS_Specification,
section FFS_Section)
    pdcch-ConfigSIB1             INTEGER(0..255),
    -- Indicates that UE shall not camp on this cell
    cellBarred                   ENUMERATED {barred,
notBarred},
    -- Controls cell reselection to intra-frequency cells when the highest ranked cell is
barred, or treated as barred by the UE,
    -- as specified in TS 38.304.
    intraFreqReselection         ENUMERATED {allowed, notAllowed},
    spare                        BITSTRING (SIZE (1))
}
-- TAG-MIB-STOP
-- ASN1STOP
```

For that particular case of PCI (i.e. SSB) transmitted with MIB but without SIB1, there will be no CGI related information to be acquired or reported. Hence, if the existing procedure described above, i.e., the one defined in LTE, even perhaps with some updates, the UE may quickly/immediately know that it will not be able to acquire CGI related information to be reported but it may wait for the expiry of timer T321 to send the empty measurement report. As that timer may be relatively long (between 1 to 8 seconds) and the UE may be in a coverage limited situation (which in the first place led the UE to send a measurement report with an unknown PCI), radio link failure may occur before the UE can send the report to the network. OR, if this is an EN-DC scenario where EUTRAN has configured the UE to acquire CGI associated with an NR cell, it may take so long to get that information that after this time the network may not need to setup EN-DC any longer (e.g., data session is finished over LTE).

According to some embodiments of inventive concepts, methods may be executed by a wireless terminal (also referred to as a user equipment or UE) to addressing CGI reporting in the NR scenarios with cells that do not transmit CGI.

In the event that the UE is configured to report a CGI associated with a cell, embodiments of such methods may be described as follows:

A UE being configured by the network to report CGI related information associated with one cell;

Upon that configuration, the UE may start one instance of the report CGI failure timer (like T321 in LTE);

Upon the UE reading the Master Information Block MIB associated with the one cell configured in the previous step, the UE may identify that the one cell does not contain an associated SIB1 (i.e., the UE is not able to acquire CGI information for that cell).

Upon detecting that the cell/PCI (encoded in SSB) and associated MIB from which the UE has to acquire CGI information associated to a given measurement identifier, that there is no SIB1 associated (based on the indication in MIB), the UE may perform the following actions:

The UE may send a measurement report without waiting for the expiry of the CGI reporting failure timer (like T321 in LTE) even though CGI information could not be acquired; and/or The UE may stop the report CGI failure timer (like T321 in LTE) even though the UE has not acquired CGI information for a given cell that the UE is configured to report CGI.

In the event that the UE is configured to report CGI associated with multiple cells, the method is described as discussed below for a UE being configured to report CGI related information relating to multiple cells with: a single timer; and multiple timers.

According to some embodiments where the UE is configured to report CGI related information related to multiple cells using a single timer, the following operations may be performed.

Upon the UE receiving the configuration to report CGI related information related to multiple cells, the UE may start one instance of the report CGI failure timer (like T321 in LTE) for these multiple cells;

The UE reading the MIBs associated with these multiple cells configured in the previous step may identify that one or multiple of these cells do not contain an associated SIB1 (i.e., the UE is not able to acquire CGI information for one or multiple of these cells).

Upon detecting that at least for one PCI (encoded in SSB) and associated MIB from which the UE has to acquire CGI information associated with a given measurement identifier, that there is no SIB1 associated (based on the indication in MIB), the UE may perform the following actions:

Sending a measurement report without waiting for the expiry of the single CGI reporting failure timer instance (like T321 in LTE) even though CGI information could not be acquired;

Stopping the report CGI failure timer (like T321 in LTE) even though the UE has not acquired CGI information for a given cell that the UE is configured to report CGI.

According to some embodiments where the UE is configured to report CGI related information related to multiple cells using multiple respective timers, the following operations may be performed.

Upon the UE receiving the configuration to report CGI related information related to multiple cells, the UE may start one instance of the report CGI failure timer (like T321 in LTE) for each of these multiple cells;

The UE reading the MIBs associated with these multiple cells configured in the previous step may identify that one or multiple of these cells do not contain an associated SIB1 (i.e., the UE is not able to acquire CGI information for one or multiple of these cells).

Upon detecting that at least for one PCI (encoded in SSB) and associated MIB from which the UE has to acquire CGI information associated with a given measurement identifier, that there is no SIB1 associated (based on the indication in MIB), the UE may perform the following actions:

Sending a measurement report without waiting for the expiry of each associated CGI reporting failure timer instance (like T321 in LTE) even though CGI information could not be acquired;

Stopping each associated report CGI failure timer (like T321 in LTE) even though the UE has not acquired CGI information for a given cell that the UE is configured to report CGI.

According to some embodiments of inventive concepts, the CGI reporting timer may be stopped upon detecting that SIB1 is not available for a given cell. Unnecessary waiting by the UE for expiration of a CGI reporting failure timer (like T321 in LTE) to indicate to the network that a given cell is not broadcasting CGI related information may thus be reduced/avoided.

Some embodiments of inventive concepts may relate to UE actions upon being provided by the network with a CGI reporting configuration. Such embodiments may apply to the following cases where a first RAT can be LTE and a second RAT can be NR:

A CGI reporting configuration may be provided by a first Radio Access Technology RAT and the UE may acquire CGI information for one or multiple cells in the same first RAT;

CGI reporting configuration may be provided by a first RAT and the UE may acquire CGI information for one or multiple cells in a second RAT;

The configuration indicated by the network to the UE may be one of the following:

A PCI or list of PCIs from which the network wants related CGI information to be reported;

Alternatively, the network may provide implicitly or explicitly an indication to the UE to acquire CGI associated to a given measurement object (e.g., multiple PCIs the UE can detect in a given frequency).

Upon detecting that at least for one PCI (encoded in a Synchronization Signal Block SSB) and associated MIB from which the UE has to acquire CGI information associated to a given measurement identifier, that there is no SIB1 associated (thanks to the indication in MIB), the UE may perform the following actions:

Sending a measurement report without waiting for the expiry of the CGI reporting failure timer (like T321 in LTE) even though CGI information could not be acquired;

According to some embodiments, in the event of a single cell being configured for CGI reporting (explicitly configured via PCI or implicitly configured), a measurement report may be sent quickly/immediately after the UE detects that this single cell has no SIB1 being broadcasted (by reading the SIB1 configuration from MIB) without waiting for the expiry of the CGI reporting failure timer (like T321 in LTE);

According to some other embodiments, in the event of multiple cells being configured for CGI reporting (explicitly configured via a list of PCI or implicitly configured via a given frequency from which the UE can find PCIs), a measurement report may be sent quickly/immediately after i) the UE detects one or multiple cells that have no SIB1 being broadcasted (by reading the SIB1 configuration from MIB) and ii) acquiring SIB1 for all other cells that have CGI related information associated; In other words, although timer T321 is still running and CGI information was not acquired for all configured cells, the UE may anyway send a measurement report even though it has not acquired SIB1 for all cells it has been configured to acquire;

When it comes to the setting of a measurement report, the following embodiments may be applied:

According to some embodiments, for each cell the UE detects that there is no CGI associated belonging to a first set of cells, the measurement report may leave empty the CGI information for the cells not transmitting SIB; If multiple cells are reported in the same measurement report, and for a second set of cells for which the UE has acquired CGI information, the report may contain CGI information for the second set of cells and empty CGI information for the first set of cells.

According to some other embodiments, the measurement report may include an indication of no CGI info available (or no SIB1 being broadcasted) for each cell from a first set of cells the UE could no acquire CGI information due to the lack of SIB1 indicated in MIB. If multiple cells are reported in the same measurement report, and for a second set of cells the UE has acquired CGI information, the report will contain CGI information for the second set of cells and indication of lack of SIB1 indicated in MIB for the first set of cells.

According to still other embodiments, the CGI information in measurement report may be left empty for cells the UE has not been able to detect SIB1 (although the MIB indicated that there was a SIB1, i.e., UE has not acquired due to some problem such as coverage limitation) and the indication of lack of SIB1 for the cells where MIB indicated that SIB1 was not being transmitted.

Stopping the report CGI failure timer (like T321 in LTE) even though the UE has not acquired CGI information for a given cell that the UE is configured to report CGI;

According to some embodiments, in the case of a single cell being configured for CGI reporting (explicitly configured via PCI or implicitly configured), the CGI reporting failure timer (like T321 in LTE) may be stopped after the UE detects that this single cell has no SIB1 being broadcasted (by reading the SIB1 configuration from MIB).

According to some other embodiments, in the case of multiple cells being configured for CGI reporting (explicitly configured via a list of PCIs or implicitly configured via a given frequency from which UE can find PCIs), If there is one single CGI reporting failure timer (like T321 in LTE) for all configured cells In some embodiments, the UE stops the said single CGI reporting failure timer if it detects that at least one of the configured cell has no SIB1 being broadcasted (by reading the SIB1 configuration from MIB), and also aborts the acquisition of CGI for other cells as well.

In other embodiments, the UE only stops the said single CGI reporting failure timer when it detects that none of the configured cells have no SIB1 being broadcasted.

If there are multiple CGI reporting failure timers (like T321 in LTE) for all configured cells, the UE stops the corresponding CGI reporting failure timers for which it detects that there are no SIB1 being broadcasted.

According to some embodiments of inventive concept, a UE may reduce/avoid waiting for the expiry of the CGI report failure timer T321 to send a measurement report when the UE detects that a given cell is not broadcasting SIB1 containing CGI related information.

Operations of a wireless terminal UE will now be discussed with reference to the flow chart of FIG. 5 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 5.

At block 501, processor 4003 may receive (through transceiver 4001) from the RAN a request to report a cell identifier of a neighbor cell. At block 503, processor 4003 may start a timer responsive to receiving the request to report the cell identifier, wherein starting the timer may include initiating the timer. At block 505, processor 4003 may obtain (through transceiver 4001) system information from the neighbor cell, wherein the system information indicates that the neighbor cell does not broadcast a cell identifier.

The system information of block 505, for example, may be obtained responsive to receiving the request of block 501.

At block 507, processor 4003 may stop the timer before expiration of the timer responsive to obtaining the system information including the indication that the neighbor cell does not broadcast a cell identifier of the neighbor cell. At block 509, processor 4003 may transmit (through transceiver 4001) a measurement report (also referred to as a cell identifier report) to the RAN responsive to obtaining the system information indicating that the neighbor cell does not broadcast a cell identifier, wherein the measurement report indicates that the neighbor cell does not broadcast a cell identifier. The measurement report, for example, may include an empty field for the cell identifier of the neighbor cell.

Figure 5:
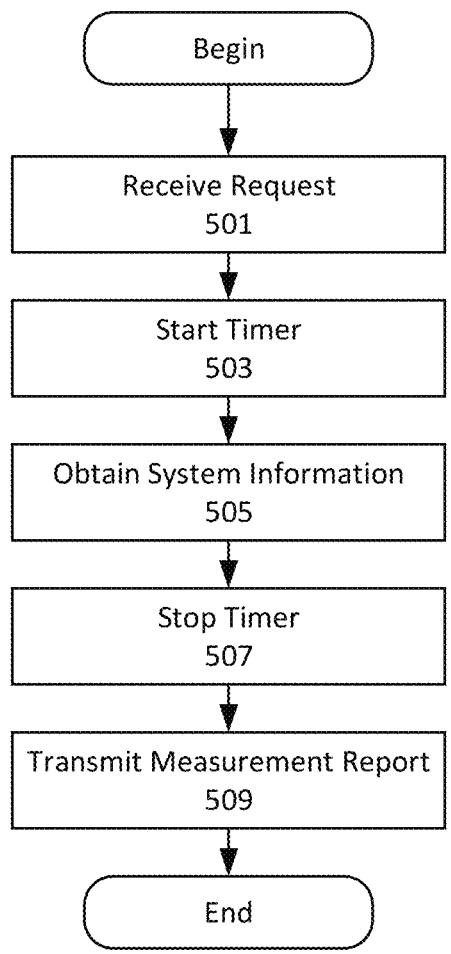

Various operations from the flow chart of FIG. 5 may be optional with respect to some embodiments of wireless communication devices and related methods. Regarding methods of some embodiments, for example, operations of block 509 of FIG. 5 may be optional. Operations of a wireless terminal UE will now be discussed with reference to the flow chart of FIG. 6 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 6.

At block 601, processor 4003 may receive (through transceiver 4001) from the RAN a request to report a cell identifier of a first neighbor cell and a cell identifier of a second neighbor cell. At block 603, processor 4003 may start a timer responsive to receiving the request to report the cell identifiers of the first and second neighbor cells, wherein the timer is associated with the first and second neighbor cells. Starting the timer may include initiating the timer.

At block 605a, processor 4003 may obtain (through transceiver 4001) first system information from the first neighbor cell, wherein the first system information indicates that the first neighbor cell does not broadcast a cell identifier. At block 605b, processor 4003 may obtain (through transceiver 4001) second system information from the second neighbor cell, wherein the second system information indicates that the second neighbor cell does broadcast a cell identifier. At block 607, processor 4003 may stop the timer before expiration of the timer responsive to obtaining the first system information including the indication that the first neighbor cell does not broadcast a cell identifier of the first neighbor cell.

According to some embodiments, the first system information of block 605a and/or the second information of block 605b may be obtained responsive to receiving the request of block 601.

At block 609, processor 4003 may transmit (through transceiver 4001) a measurement report (also referred to as a cell identifier report) to the RAN responsive to obtaining the first system information indicating the that first neighbor cell does not broadcast a cell identifier, wherein the measurement report indicates that the first neighbor cell does not broadcast a cell identifier and that the second neighbor cell does broadcast a cell identifier. Moreover, the measurement report may include respective empty fields for cell identifiers for the first and second neighbor cells. At block 610, processor 4003 may abort acquisition of a cell identifier of the second neighbor cell responsive to obtaining the first system information including the indication that the first neighbor cell does not broadcast a cell identifier.

Figure 6:
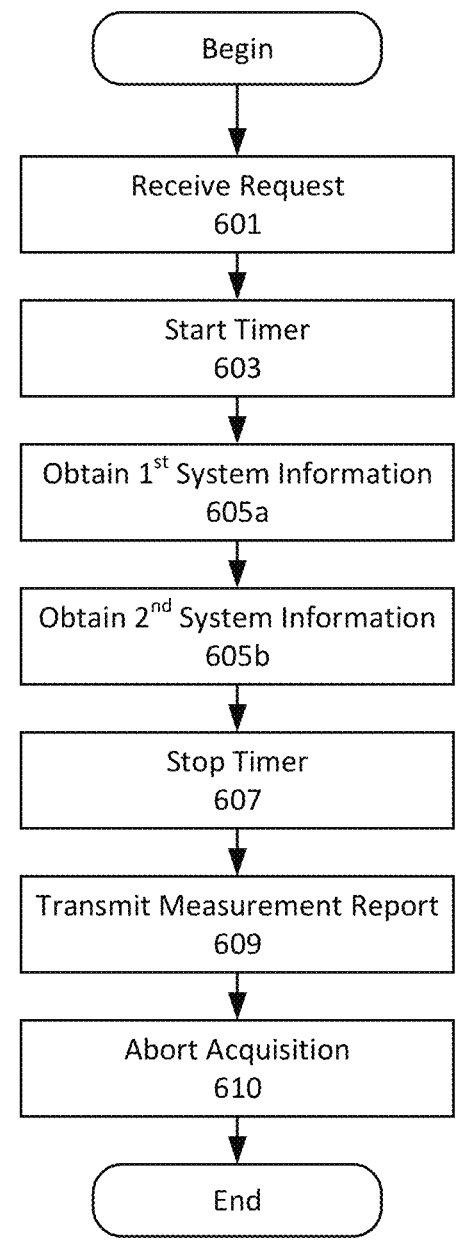

Various operations from the flow chart of FIG. 6 may be optional with respect to some embodiments of wireless communication devices and related methods. Regarding methods of some embodiments, for example, operations of blocks 605*b*, 609, and 610 of FIG. 6 may be optional.

Operations of a wireless terminal UE will now be discussed with reference to the flow chart of FIG. 7 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 7.

At block 701, processor 4003 may receive (through transceiver 4001) from the RAN a request to report a cell identifier of a first neighbor cell and a cell identifier of a second neighbor cell. At block 703*a*, processor 4003 may start a first timer responsive to receiving the request to report the cell identifiers of the first and second neighbor cells. At block 703*b*, processor 4003 may start a second timer responsive to receiving the request to report cell identifiers of the first and second neighbor cells, wherein starting the timer may include initiating the timer.

At block 705*a*, processor 4003 may obtain (through transceiver 4001) first system information from the first neighbor cell, wherein the first system information indicates that the first neighbor cell does not broadcast a cell identifier. At block 705*b*, processor 4003 may obtain (through transceiver 4001) second system information from the second neighbor cell, wherein the second system information indicates that the second neighbor cell does broadcast a cell identifier. At block 707, processor 4003 may stop the first timer before expiration of the first timer responsive to obtaining the first system information including the indication that the first neighbor cell does not broadcast a cell identifier of the first neighbor cell.

According to some embodiments, the first system information of block 705*a* and/or the second system information of block 705*b* may be obtained responsive to receiving the request of block 701.

At block 709*a*, processor 4003 may transmit (through transceiver 4001) a first measurement report (also referred to as a first cell identifier report) to the RAN responsive to obtaining the first system information indicating the that first neighbor cell does not broadcast a cell identifier, wherein the first measurement report indicates that the first neighbor cell does not broadcast a cell identifier.

At block 709*b*, processor 4003 may transmit (through transceiver 4001) a second measurement report (also referred to as a second cell identifier report) to the RAN responsive to obtaining the second system information indicating that the second neighbor cell does broadcast a cell identifier, wherein the second measurement report indicates that the second neighbor cell does broadcast a cell identifier. According to some embodiments, processor 4003 may transmit the second measurement report responsive to failure to acquire a cell identifier of the second neighbor cell before expiration of the second timer and responsive to obtaining the second system information indicating that the second neighbor cell does broadcast a cell identifier. According to some embodiments, processor 4003 may transmit the second measurement report responsive to receiving a cell identifier from the second neighbor cell, wherein the second measurement report includes the cell identifier from the second neighbor cell, and the first measurement report may include an empty field for a cell identifier of the first neighbor cell.

According to some embodiments, the first measurement report of block 709*a* may include an empty field for the cell identifier for the first neighbor cell, and/or the second measurement report of block 709*b* may include an empty field for the cell identifier of the second neighbor cell.

The first measurement report of block 709*a* may be transmitted before the second measurement report of block 709*b*, and/or the second measurement report of block 709*b* may be transmitted after stopping the first timer at block 707. Moreover, the second timer may continue to run after stopping the first timer.

Various operations from the flow chart of FIG. 7 may be optional with respect to some embodiments of wireless communication devices and related methods. Regarding methods of some embodiments, for example, operations of blocks 703*b*, 705*b*, 709*a*, and 709*b* of FIG. 7 may be optional.

Operations of a wireless terminal UE will now be discussed with reference to the flow chart of FIG. 8 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 8.

At block 801, processor 4003 may receive (through transceiver 4001) from the RAN a request to report a cell identifier of a first neighbor cell and a cell identifier of a second neighbor cell. At block 803, processor 4003 may start a timer responsive to receiving the request to report the cell identifier of the first neighbor cell and the cell identifier of the second neighbor cell, wherein starting the timer may include initiating the timer. The timer may be associated with the first and second neighbor cells.

At block 805*a*, processor 4003 may obtain (through transceiver 4001) first system information from the first neighbor cell, wherein the first system information indicates that the first neighbor cell does not broadcast a cell identifier. At block 805*b*, processor 4003 may obtain (through transceiver 4001) second system information from the second neighbor cell, wherein the second system information indicates that the second neighbor cell does not broadcast a cell identifier. At block 807, processor 4003 may stop the timer before expiration of the timer responsive to obtaining the first system information including the indication that the first neighbor cell does not broadcast a cell identifier of the first neighbor cell.

According to some embodiments, the first system information of block 805*a* and/or the second system information of block 805*b* may be obtained responsive to receiving the request of block 801.

At block 809, processor 4003 may transmit a measurement report (also referred to as a cell identifier report) to the RAN responsive to obtaining the first system information indicating the that first neighbor cell does not broadcast a cell identifier and responsive to obtaining the second system information indicating that the second neighbor cell does not broadcast a cell identifier, wherein the measurement report indicates that the first neighbor cell does not broadcast a cell identifier and that the second neighbor cell does not broadcast a cell identifier. According to some embodiments, the measurement report may include respective empty fields for cell identifiers for the first and second neighbor cells.

Various operations from the flow chart of FIG. 8 may be optional with respect to some embodiments of wireless communication devices and related methods. Regarding methods of some embodiments, for example, operations of blocks 805*b* and 809 of FIG. 8 may be optional. According to embodiments discussed above with respect to any of FIGS. 5, 6, 7, and/or 8, the timer(s) may be a report failure timer(s), such as a cell global identifier, CGI, timer (e.g., a T321 timer). At any of blocks 507, 607, 707, and/or 807, stopping a timer may include aborting acquisition of a cell identifier of a neighbor cell responsive to obtaining system information including an indication that a neighbor cell does not broadcast a cell identifier.

At any of blocks 501, 601, 701, and/or 801, the request from the RAN may include a first cell identifier of the neighbor cell, and the cell identifier of the neighbor cell may be a second cell identifier of the neighbor cell different than the first identifier. For example, the first identifier may be a physical cell identifier, PCI, and the second cell identifier may be a cell global identifier, CGI. At any of blocks 501, 601, 701, and/or 801, the request from the RAN may identify a frequency used by the neighbor cell, and the system information may be obtained based on the frequency used by the neighbor cell.

Operations of a wireless terminal UE will now be discussed with reference to the flow chart of FIG. 9 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 9.

At block 901, processor 4003 may receive (through transceiver 4001) from the RAN a request to report respective cell identifiers of first and second neighbor cells. At block 903, processor 4003 may start a timer (e.g., a T321 timer) responsive to receiving the request to report the cell identifiers of the first and second neighbor cells, wherein starting the timer may include initiating the timer.

At block 905*a*, processor 4003 may obtain (through transceiver 4001) first system information from the first neighbor cell, wherein the first system information indicates that the neighbor cell does not broadcast a cell identifier. At block 905*b*, processor 4003 may obtain (through transceiver 4001) second system information from the second neighbor cell, wherein second system information indicates that the second neighbor cell does broadcast a cell identifier. At block 907, processor 4003 may acquire the cell identifier of the second neighbor cell responsive to obtaining the second system information indicating that the second neighbor cell does broadcast the cell identifier.

According to some embodiments, the first system information of block 905*a* and/or the second system information of block 905*b* may be obtained responsive to receiving the request of block 901.

At block 909*a*, processor 4003 may transmit (through transceiver 4001) a first measurement report (also referred to as a cell identifier report) to the RAN responsive to obtaining the first system information indicating the that first neighbor cell does not broadcast a cell identifier, wherein the first measurement report indicates that the first neighbor cell does not broadcast a cell identifier.

At block 909*b*, processor 4003 may transmit (through transceiver 4001) a second measurement report (also referred to as a second cell identifier report) to the RAN responsive to obtaining the second system information indicating that the second neighbor cell does broadcast a cell identifier, wherein the second measurement report indicates that the second neighbor cell does broadcast a cell identifier. Moreover, the second measurement report may include the cell identifier of the second neighbor cell responsive to acquiring the cell identifier of the second neighbor cell before expiration of the timer.

Various operations from the flow chart of FIG. 9 may be optional with respect to some embodiments of wireless communication devices and related methods. Regarding methods of some embodiments, for example, operations of blocks 903 and 907 of FIG. 9 may be optional. Operations of a wireless terminal UE will now be discussed with reference to the flow chart of FIG. 10 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 10.

At block 1001, processor 4003 may receive (through transceiver 4001) from the RAN a request to report respective cell identifiers of first and second neighbor cells. At block 1003, processor 4003 may start a timer (e.g., a T321 timer) responsive to receiving the request to report the cell identifiers of the first and second neighbor cells, wherein starting the timer may include initiating the timer.

At block 1005*a*, processor 4003 may obtain (through transceiver 4001) first system information from the first neighbor cell, wherein the first system information indicates that the neighbor cell does not broadcast a cell identifier. At block 1005*b*, processor 4003 may obtain (through transceiver 4001) second system information from the second neighbor cell, wherein second system information indicates that the second neighbor cell does broadcast a cell identifier.

According to some embodiments, the first system information of block 1005*a* and/or the second system information of block 1005*b* may be obtained responsive to receiving the request of operation 1001.

At block 1009*a*, processor 4003 may transmit (through transceiver 4001) a first measurement report (also referred to as a cell identifier report) to the RAN responsive to obtaining the first system information indicating the that first neighbor cell does not broadcast a cell identifier, wherein the first measurement report indicates that the first neighbor cell does not broadcast a cell identifier.

At block 1009*b*, processor 4003 may transmit (through transceiver 4001) a second measurement report (also referred to as a cell identifier report) to the RAN responsive to obtaining the second system information indicating that the second neighbor cell does broadcast a cell identifier, wherein the second measurement report indicates that the second neighbor cell does broadcast a cell identifier. The second measurement report may include an empty field for the cell identifier of the second neighbor cell responsive to failure to acquire the cell identifier of the second neighbor cell before expiration of the timer.

Various operations from the flow chart of FIG. 10 may be optional with respect to some embodiments of wireless communication devices and related methods. Regarding methods of some embodiments, for example, operations of block 1003 of FIG. 10 may be optional.

According to some embodiments discussed above with respect to any of FIGS. 9 and/or 10, the request from the RAN (at any of blocks 901 and/or 1001) may include a first cell identifier of the first neighbor cell and the cell identifier of the first neighbor cell may be a second cell identifier of the first neighbor cell different than the first identifier.

Moreover, the request from the RAN may include a third cell identifier of the second neighbor cell and the cell identifier of the second neighbor cell may be a fourth cell identifier of the second neighbor cell different than the third identifier. The first and third identifiers may be respective first and third physical cell identifiers, PCSs, and the second and fourth cell identifiers may be respective cell global identifiers, CGIs.

The request from the RAN (at any of blocks 901 and/or 1001) may identify respective frequencies used by the first and second neighbor cells, and obtaining the first and second system information (at any of blocks 905a, 905b, 1005a, and/or 1005b) may include obtaining the first and second system information based on the respective frequencies used by the first and second neighbor cells. Moreover, the first measurement report (of blocks 909a and/or 1009a) may include an empty field for the cell identifier of the first neighbor cell, and/or the first measurement report (of blocks 909a and/or 1009a) may be transmitted before the second measurement report (of blocks 909b and/or 1009b).

Operations of a wireless terminal UE will now be discussed with reference to the flow chart of FIG. 11 according to some embodiments of inventive concepts. For example, modules may be stored in memory 4005 of FIG. 3, and these modules may provide instructions so that when the instructions of a module are executed by wireless terminal processor 4003, processor 4003 performs respective operations of the flow chart of FIG. 11.

At block 1101, processor 4003 may receive (through transceiver 4001) from the RAN a request to report a cell identifier of a neighbor cell. According to some embodiments, the request from the RAN may include a first identifier of the neighbor cell, and the cell identifier of the neighbor cell may be a second cell identifier of the neighbor cell different than the first identifier. For example, the first identifier may be a physical cell identifier, PCI, and the second cell identifier may be a cell global identifier, CGI.

At block 1103, processor 4003 may start a timer (e.g., a report failure timer, such as a CGI T321 timer) responsive to receiving the request to report the cell identifier.

At block 1105, processor 4003 may obtain system information from the neighbor cell, wherein the system information indicates that the neighbor cell does not broadcast a cell identifier.

According to some embodiments, the system information of block 1105 may be obtained responsive to receiving the request of block 1101.

At block 1107, processor 4003 may stop the timer before expiration of the timer responsive to obtaining the system information including the indication that the neighbor cell does not broadcast a cell identifier of the neighbor cell. Stopping the timer may include aborting acquisition of a cell identifier of the neighbor cell responsive to obtaining the system information including the indication that the first neighbor cell does not broadcast a cell identifier.

At block 1109, processor 4003 may transmit a measurement report (also referred to as a cell identifier report) to the RAN responsive to obtaining the system information indicating that the neighbor cell does not broadcast a cell identifier, wherein the measurement report indicates that the neighbor cell does not broadcast a cell identifier. According to some embodiments, the measurement report may include an empty field for the cell identifier of the neighbor cell.

According to some embodiments, the request from the RAN at block 1101 may identify a frequency used by the neighbor cell, and at block 1105, processor 4003 may obtain the system information based on the frequency used by the neighbor cell.

Various operations from the flow chart of FIG. 11 may be optional with respect to some embodiments of wireless communication devices and related methods. Regarding methods of some embodiments, for example, operations of block 1003 and 1107 of FIG. 11 may be optional.

According to some embodiments discussed above with respect to FIGS. 5-11, the system information may be obtained from a Master Information Block MIB received from the neighbor cell. According to some other embodiments, the system information may indicate that the neighbor cell does not broadcast a cell identifier by indicating that the neighbor cell does not provide a System Information Block SIB including information for cell identifier reporting, or the system information may indicate that the neighbor cell does not broadcast a cell identifier by indicating that the neighbor cell does not provide a System Information Block 1 SIB1 including information for cell identifier reporting.

According to some embodiments discussed above with respect to FIGS. 5-11, the request from the RAN may include a first cell identifier of the first neighbor cell, the cell identifier of the first neighbor cell may be a second cell identifier of the first neighbor cell different than the first identifier, the request from the RAN may include a third cell identifier of the second neighbor cell, and the cell identifier of the second neighbor cell may be a fourth cell identifier of the second neighbor cell different than the third identifier. The first and third identifiers may be respective first and third physical cell identifiers PCS s and the second and fourth cell identifiers may be respective cell global identifiers CGIs.

According to some embodiments discussed above with respect to FIGS. 5-11, the request from the RAN may identify respective frequencies used by the first and second neighbor cells, and obtaining the first and second system information may include obtaining the first and second system information based on the respective frequencies used by the first and second neighbor cells.

Example embodiments of inventive concepts are set forth below.

1. A method of operating a wireless terminal (UE) in a radio access network, RAN, the method comprising: receiving a request from the RAN to report a cell identifier of a neighbor cell; initiating a timer responsive to receiving the request to report the cell identifier; obtaining system information from the neighbor cell responsive to receiving the request, wherein the system information indicates that the neighbor cell does not broadcast a cell identifier; and stopping the timer before expiration of the timer responsive to obtaining the system information including the indication that the neighbor cell does not broadcast a cell identifier of the neighbor cell.

2. The method of Embodiment 1, further comprising: transmitting a cell identifier report (also referred to as a measurement report) to the RAN responsive to obtaining the system information indicating that the neighbor cell does not broadcast a cell identifier, wherein the cell identifier report indicates that the neighbor cell does not broadcast a cell identifier.

3. The method of Embodiment 2, wherein the cell identifier report includes an empty field for the cell identifier of the neighbor cell.

4. The method of Embodiment 1, wherein the neighbor cell is a first neighbor cell, wherein the system information is first system information, wherein the request from the RAN is a request to report a cell identifier of the first neighbor cell and a cell identifier of a second neighbor cell, and wherein the timer is associated with the first and second neighbor cells, the method further comprising: obtaining second system information from the second neighbor cell responsive to receiving the request, wherein the second system information indicates that the second neighbor cell does broadcast a cell identifier; and transmitting a cell identifier report (also referred to as a measurement report) to the RAN responsive to obtaining the first system information indicating the that first neighbor cell does not broadcast a cell identifier, wherein the cell identifier report indicates that the first neighbor cell does not broadcast a cell identifier and that the second neighbor cell does broadcast a cell identifier.

5. The method of Embodiment 4, wherein the cell identifier report includes respective empty fields for cell identifiers for the first and second neighbor cells.

6. The method of any of Embodiments 4-5, further comprising: aborting acquisition of a cell identifier of the second neighbor cell responsive to obtaining the first system information including the indication that the first neighbor cell does not broadcast a cell identifier.

7. The method of Embodiment 1, wherein the neighbor cell is a first neighbor cell, wherein the system information is first system information, wherein the request from the RAN is a request to report a cell identifier of the first neighbor cell and a cell identifier of a second neighbor cell, and wherein the timer is a first timer, the method further comprising: initiating a second timer responsive to receiving the request to report cell identifiers of the first and second neighbor cells; obtaining second system information from the second neighbor cell responsive to receiving the request, wherein second system information indicates that the second neighbor cell does broadcast a cell identifier; transmitting a first cell identifier report (also referred to as a first measurement report) to the RAN responsive to obtaining the first system information indicating the that first neighbor cell does not broadcast a cell identifier, wherein the first cell identifier report indicates that the first neighbor cell does not broadcast a cell identifier; and transmitting a second cell identifier report (also referred to as a second measurement report) to the RAN responsive to obtaining the second system information indicating that the second neighbor cell does broadcast a cell identifier, wherein the second cell identifier report indicates that the second neighbor cell does broadcast a cell identifier.

8. The method of Embodiment 7, wherein transmitting the second cell identifier report comprises transmitting the second cell identifier report responsive to failure to acquire a cell identifier of the second neighbor cell before expiration of the second timer, and responsive to obtaining the second system information indicating that the second neighbor cell does broadcast a cell identifier.

9. The method of Embodiment 8, wherein the first cell identifier report includes an empty field for the cell identifier for the first neighbor cell, and/or wherein the second cell identifier report includes an empty field for the cell identifier of the second neighbor cell.

10. The method of Embodiment 7, wherein transmitting the second cell identifier report comprises transmitting the second cell identifier report responsive to receiving a cell identifier from the second neighbor cell, wherein the second cell identifier report includes the cell identifier from the second neighbor cell.

11. The method of Embodiment 10, wherein the first cell identifier report includes an empty field for a cell identifier for the first neighbor cell.

12. The method of any of Embodiments 7-11, wherein the first cell identifier report is transmitted before the second cell identifier report, and/or wherein the second cell identifier report is transmitted after stopping the first timer.

13. The method of any of Embodiments 7-12, wherein the second timer continues after stopping the first timer.

14. The method of Embodiment 1, wherein the neighbor cell is a first neighbor cell, wherein the system information is first system information, wherein the request from the RAN is a request to report a cell identifier of the first neighbor cell and a cell identifier of a second neighbor cell, and wherein the timer is associated with the first and second neighbor cells, the method further comprising: obtaining second system information from the second neighbor cell responsive to receiving the request, wherein the second system information indicates that the second neighbor cell does not broadcast a cell identifier; and transmitting a cell identifier report (also referred to as a measurement report) to the RAN responsive to obtaining the first system information indicating the that first neighbor cell does not broadcast a cell identifier and responsive to obtaining the second system information indicating that the second neighbor cell does not broadcast a cell identifier, wherein the cell identifier report indicates that the first neighbor cell does not broadcast a cell identifier and that the second neighbor cell does not broadcast a cell identifier.

15. The method of Embodiment 14, wherein the cell identifier report includes respective empty fields for cell identifiers for the first and second neighbor cells.

16. The method of any of Embodiments 1-15, wherein the timer is a report failure timer.

17. The method of Embodiment 16, wherein the report failure timer is a cell global identifier, CGI, timer.

18. The method of Embodiment 17, wherein the CGI timer is a T321 timer.

19. The method of any of Embodiments 1-18, wherein stopping the timer comprises aborting acquisition of a cell identifier of the neighbor cell responsive to obtaining the system information including the indication that the first neighbor cell does not broadcast a cell identifier.

20. The method of any of Embodiments 1-19, wherein the request from the RAN includes a first identifier of the neighbor cell, and wherein the cell identifier of the neighbor cell is a second cell identifier of the neighbor cell different than the first identifier.

21. The method of Embodiment 20, wherein the first identifier is a physical cell identifier, PCI, and the second cell identifier is a cell global identifier, CGI.

22. The method of any of Embodiments 1-21, wherein the request from the RAN identifies a frequency used by the neighbor cell, and wherein obtaining the system information comprises obtaining the system information based on the frequency used by the neighbor cell.

23. A method of operating a wireless terminal (UE) in a radio access network, RAN, the method comprising: receiving a request from the RAN to report respective cell identifiers of first and second neighbor cells; obtaining first system information from the first neighbor cell responsive to receiving the request, wherein the first system information indicates that the neighbor cell does not broadcast a cell identifier; obtaining second system information from the second neighbor cell responsive to receiving the request, wherein second system information indicates that the second neighbor cell does broadcast a cell identifier; transmitting a first cell identifier report (also referred to as a first measurement report) to the RAN responsive to obtaining the first system information indicating the that first neighbor cell does not broadcast a cell identifier, wherein the first cell identifier report indicates that the first neighbor cell does not broadcast a cell identifier; and transmitting a second cell identifier report (also referred to as a second measurement report) to the RAN responsive to obtaining the second system information indicating that the second neighbor cell does broadcast a cell identifier, wherein the second cell identifier report indicates that the second neighbor cell does broadcast a cell identifier.

24. The method of Embodiment 23 further comprising: initiating a timer responsive to receiving the request to report the cell identifiers of the first and second neighbor cells; acquiring the cell identifier of the second neighbor cell responsive to obtaining the second system information indicating that the second neighbor cell does broadcast the cell identifier; wherein the second cell identifier report includes the cell identifier of the second neighbor cell responsive to acquiring the cell identifier of the second neighbor cell before expiration of the timer.

25. The method of Embodiment 23 further comprising: initiating a timer responsive to receiving the request to report the cell identifiers of the first and second neighbor cells; wherein the second cell identifier report includes an empty field for the cell identifier of the second neighbor cell responsive to failure to acquire the cell identifier of the second neighbor cell before expiration of the timer.

26. The method of any of Embodiments 23-25, wherein the first cell identifier report includes an empty field for the cell identifier of the first neighbor cell.

27. The method of any of Embodiments 23-26, wherein the first cell identifier report is transmitted before the second cell identifier report.

28. A method of operating a wireless terminal (UE) in a radio access network, RAN, the method comprising: receiving a request from the RAN to report a cell identifier of a neighbor cell; obtaining system information from the neighbor cell responsive to receiving the request, wherein the system information indicates that the neighbor cell does not broadcast a cell identifier; and transmitting a cell identifier report (also referred to as a measurement report) to the RAN responsive to obtaining the system information indicating that the neighbor cell does not broadcast a cell identifier, wherein the cell identifier report indicates that the neighbor cell does not broadcast a cell identifier.

29. The method of Embodiment 28, wherein the cell identifier report includes an empty field for the cell identifier of the neighbor cell.

30. The method of any of Embodiments 28-29 further comprising: initiating a timer responsive to receiving the request to report the cell identifier; stopping the timer before expiration of the timer responsive to obtaining the system information including the indication that the neighbor cell does not broadcast a cell identifier of the neighbor cell.

31. The method of Embodiment 30, wherein the timer is a report failure timer.

32. The method of Embodiment 31, wherein the report failure timer is a cell global identifier, CGI, timer.

33. The method of Embodiment 32, wherein the CGI timer is a T321 timer.

34. The method of any of Embodiments 30-33, wherein stopping the timer comprises aborting acquisition of a cell identifier of the neighbor cell responsive to obtaining the system information including the indication that the first neighbor cell does not broadcast a cell identifier.

35. The method of any of Embodiments 28-34, wherein the request from the RAN includes a first identifier of the neighbor cell, and wherein the cell identifier of the neighbor cell is a second cell identifier of the neighbor cell different than the first identifier.

36. The method of Embodiment 35, wherein the first identifier is a physical cell identifier, PCI, and the second cell identifier is a cell global identifier, CGI.

37. The method of any of Embodiments 28-36, wherein the request from the RAN identifies a frequency used by the neighbor cell, and wherein obtaining the system information comprises obtaining the system information based on the frequency used by the neighbor cell.

38. A wireless terminal (UE) comprising: a transceiver (4001) configured to provide wireless network communication with a radio access network, RAN; and a processor (4003) coupled with the transceiver, wherein the processor is configured to provide wireless network communication through the transceiver, and wherein the processor is configured to perform operations according to any of Embodiments 1-37.

39. A wireless terminal (UE) wherein the wireless terminal is adapted to perform according to any of Embodiments 1-37.

Explanations are provided below for abbreviations/acronyms used in the present disclosure.

| Abbreviation | Explanation |
| --- | --- |
| 5GCN | 5G Core Network |
| ANR | Automatic Neighbor Relations |
| CRS | Cell Reference Signal |
| DC | Dual Connectivity |
| EPC | Evolved Packet Core |
| EN-DC | Eutran-NR Dual Connectivity |
| eNB | RAN node (RBS) supporting LTE radio access technology |
| gNB | RAN node (RBS) supporting NR radio access technology |
| LTE | Long Term Evolution |
| MCG | Master Cell Group (related to master node in dual connectivity) |
| MeNB | Master eNB |
| MIB | Master Information Block |
| NR | New Radio (5G) |
| NCGI | NR Cell Global Identity |
| NSA | Non-Stand-alone NR |
| OAM | Operation And Management |
| PCI | Physical Cell Identity |
| PSS | Primary Synchronization Signal |
| RAN | Radio Access Network |
| RAT | Radio Access Technology |
| SA | Stand-alone NR |
| SIB | System Information Block |
| SIB1 | System Information Block Type1 |
| SSS | Secondary Synchronization Signal |
| UE | User Equipment |

Citations are provided below for references mentioned in the present disclosure. The disclosures of each of the following references are hereby incorporated herein in their entireties by reference.

U.S. Provisional Application No. 62/570,341 entitled "Report NSA/SA NR Indicator," filed Oct. 10, 2017;

3GPP TS 36.331 v15.1.0 (2018-03), Evolved Universal Terrestrial Radio Access (E-UTRA); Radio Resource Control (RRC); Protocol specification;

3GPP TS 38.104 v15.1.0 (2018-03), NR; Base Station (BS) radio transmission and reception; and 3GPP TS 38.331 v15.1.0 (2018-03), NR; Radio Resource Control (RRC); Protocol specification Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 12:
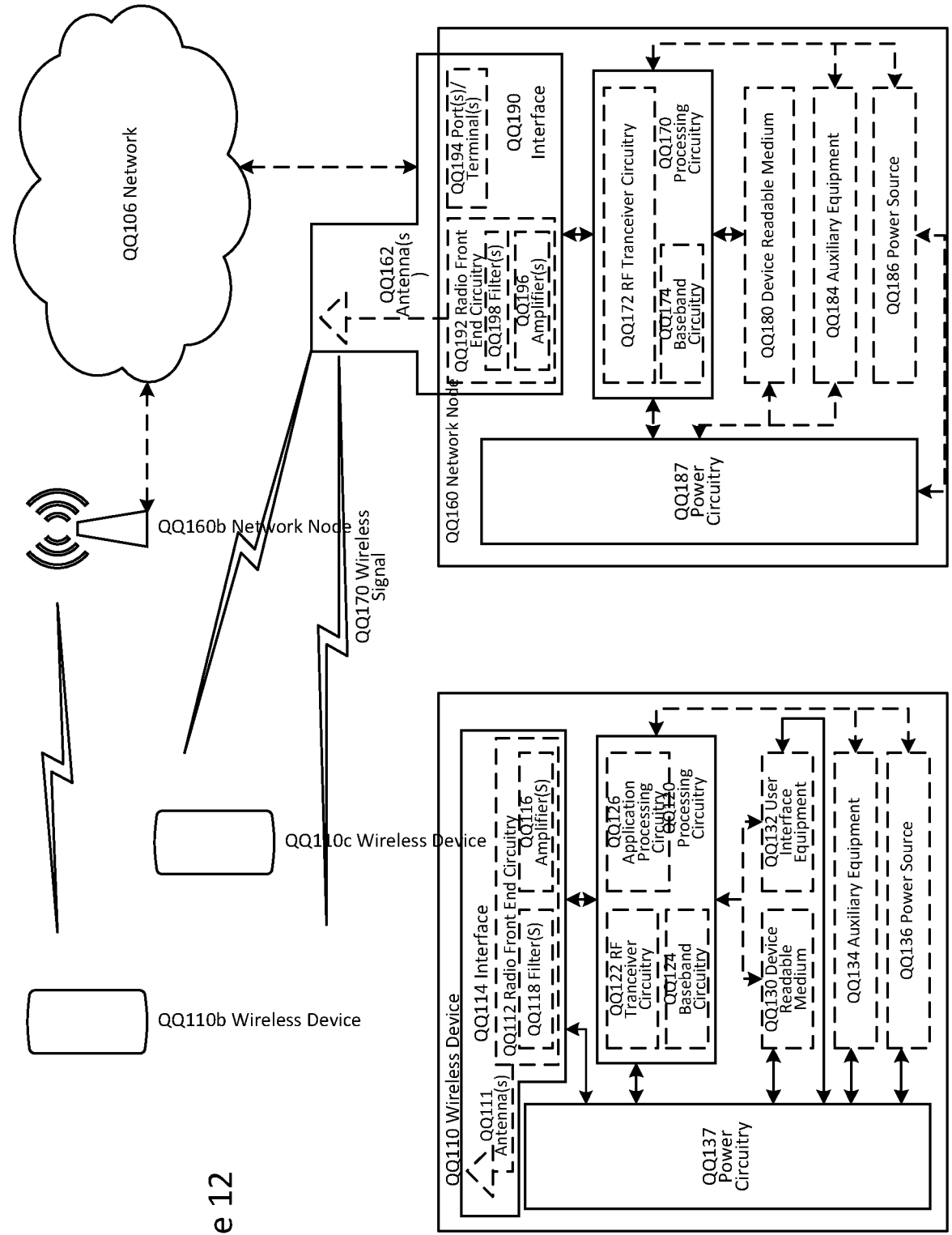
FIG. 12 is a block diagram of a wireless network in accordance with some embodiments.

FIG. 12: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 12 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 13:
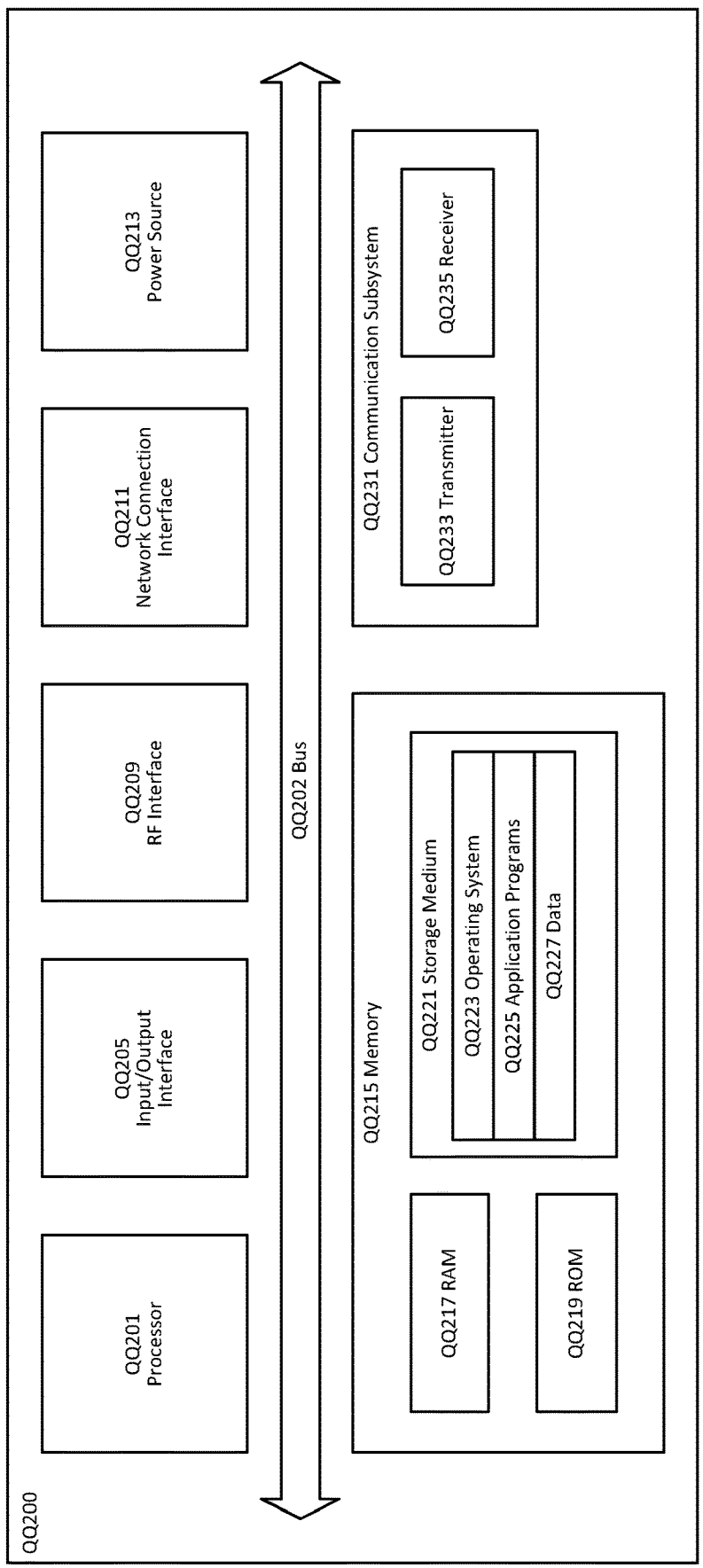
FIG. 13 is a block diagram of a user equipment in accordance with some embodiments

FIG. 13: User Equipment in Accordance with Some Embodiments

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 13, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 14:
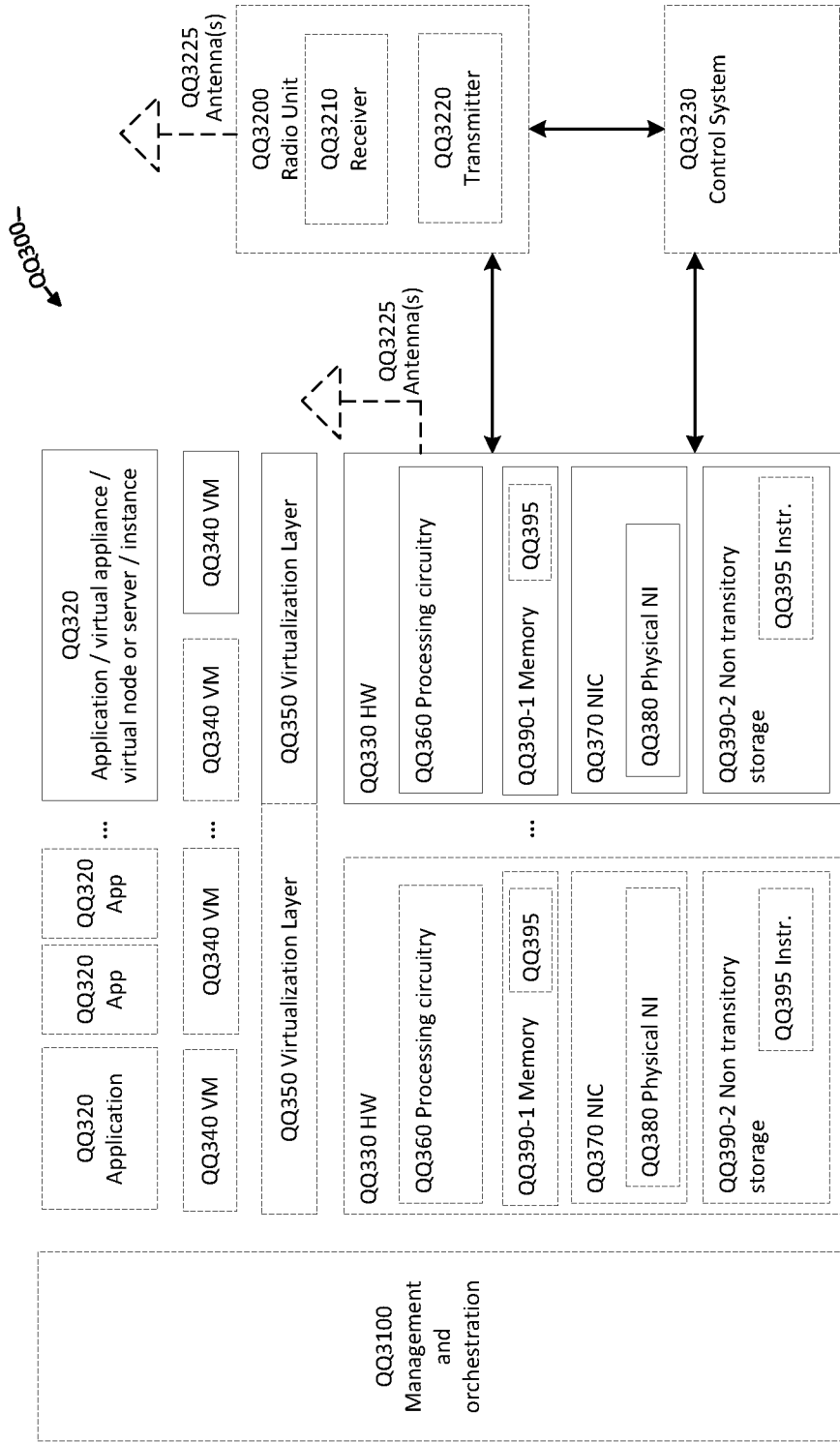
FIG. 14 is a block diagram of a virtualization environment in accordance with some embodiments.

FIG. 14: Virtualization Environment in Accordance with Some Embodiments

FIG. 14 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 14, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 14.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 15:
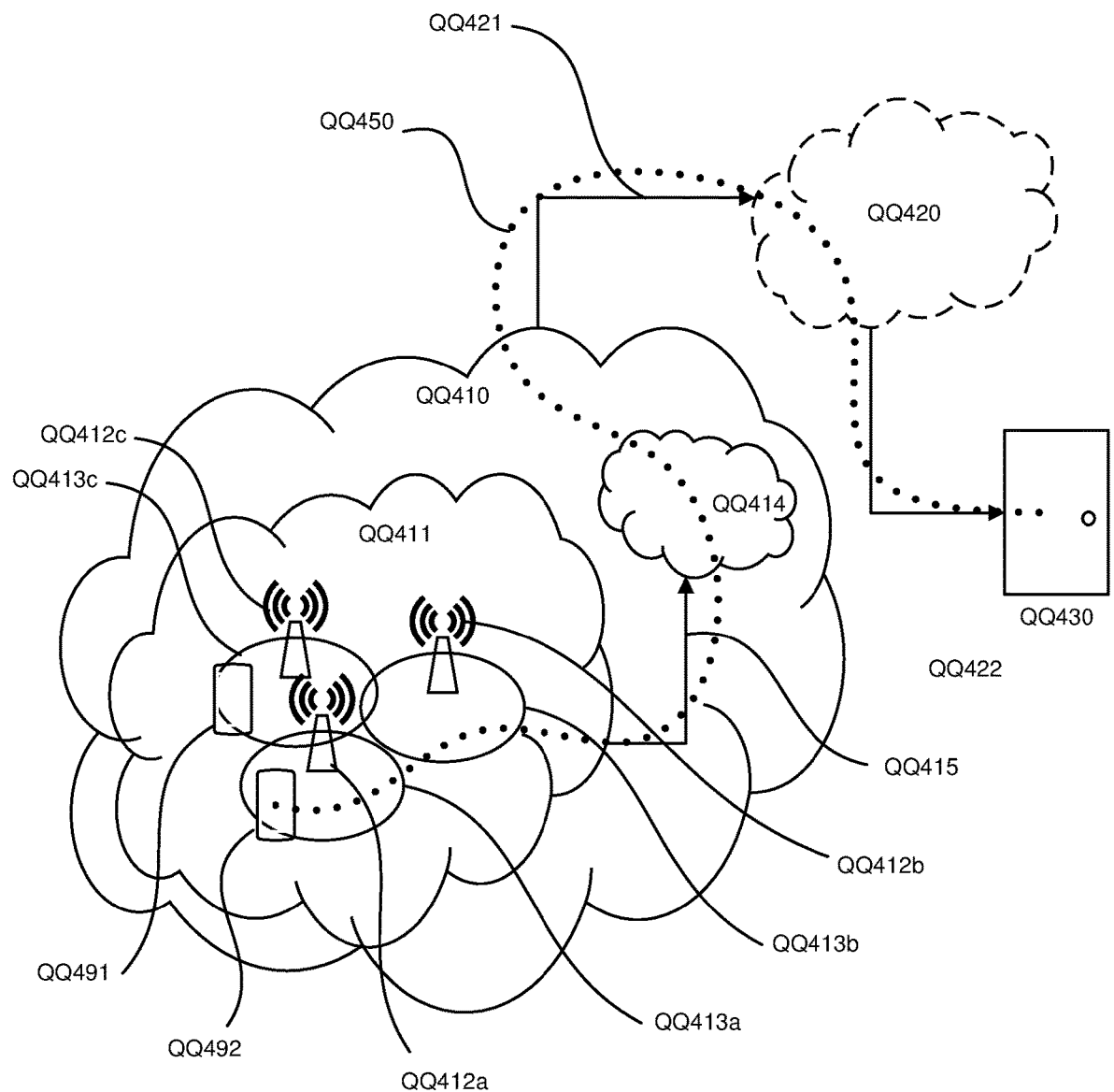
FIG. 15 is a block diagram of a telecommunication network connected via an intermediate network to a host computer in accordance with some embodiments.

FIG. 15: Telecommunication Network Connected Via an Intermediate Network to a Host Computer in Accordance with Some Embodiments.

With reference to FIG. 15, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 15 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 16:
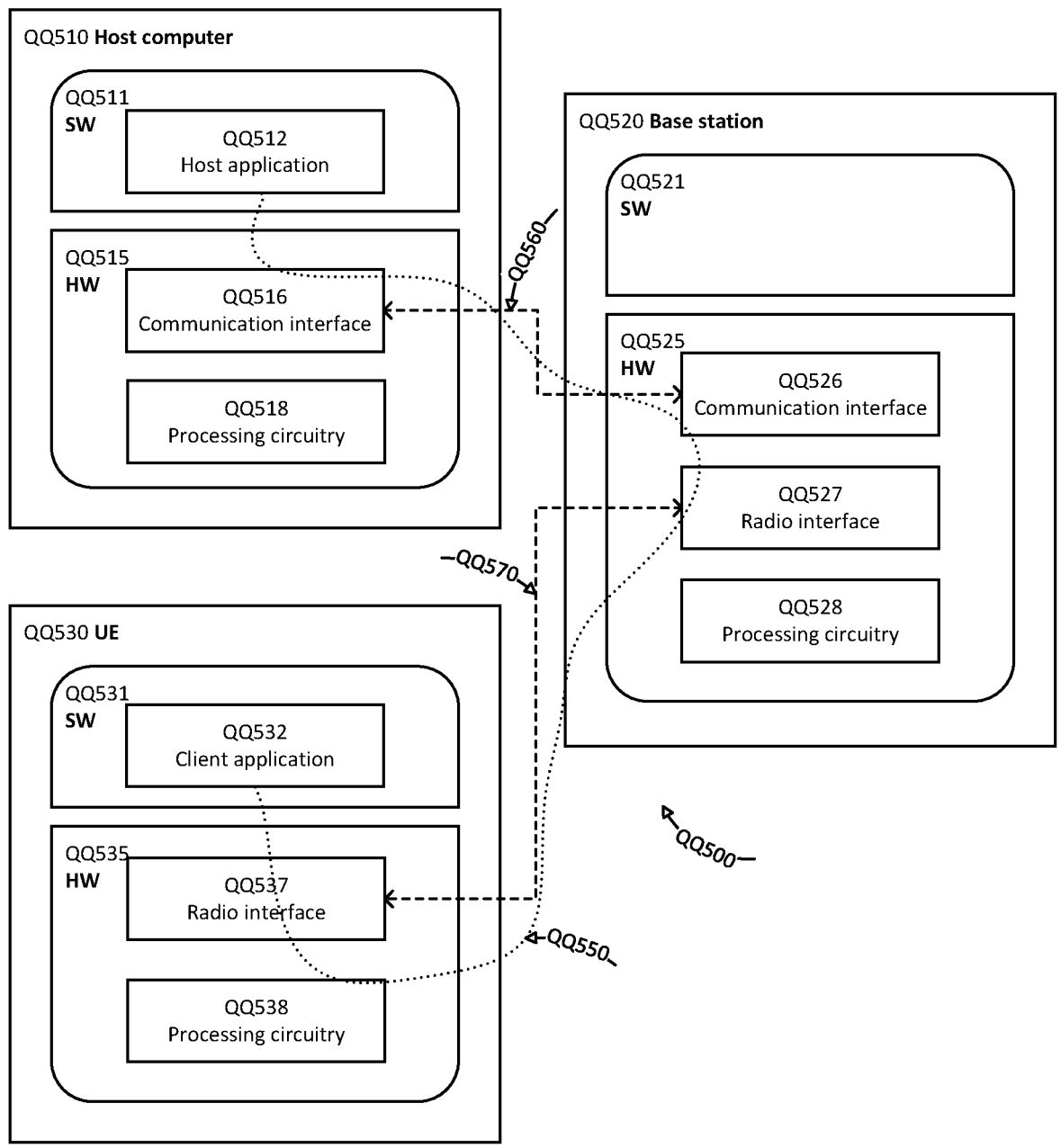
FIG. 16 is a block diagram of a host computer communicating via a base station with a user equipment over a partially wireless connection in accordance with some embodiments.

FIG. 16: Host Computer Communicating Via a Base Station with a User Equipment Over a Partially Wireless Connection in Accordance with Some Embodiments.

Example implementations, in accordance with an embodiment, of the UE, base station and host computer discussed in the preceding paragraphs will now be described with reference to FIG. 16. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 16) served by base station QQ520. Communication interface QQ526 may be configured to facilitate connection QQ560 to host computer QQ510. Connection QQ560 may be direct or it may pass through a core network (not shown in FIG. 16) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 16 may be similar or identical to host computer QQ430, one of base stations QQ412a, QQ412b, QQ412c and one of UEs QQ491, QQ492 of FIG. 15, respectively. This is to say, the inner workings of these entities may be as shown in FIG. 16 and independently, the surrounding network topology may be that of FIG. 15.

In FIG. 16, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 17:
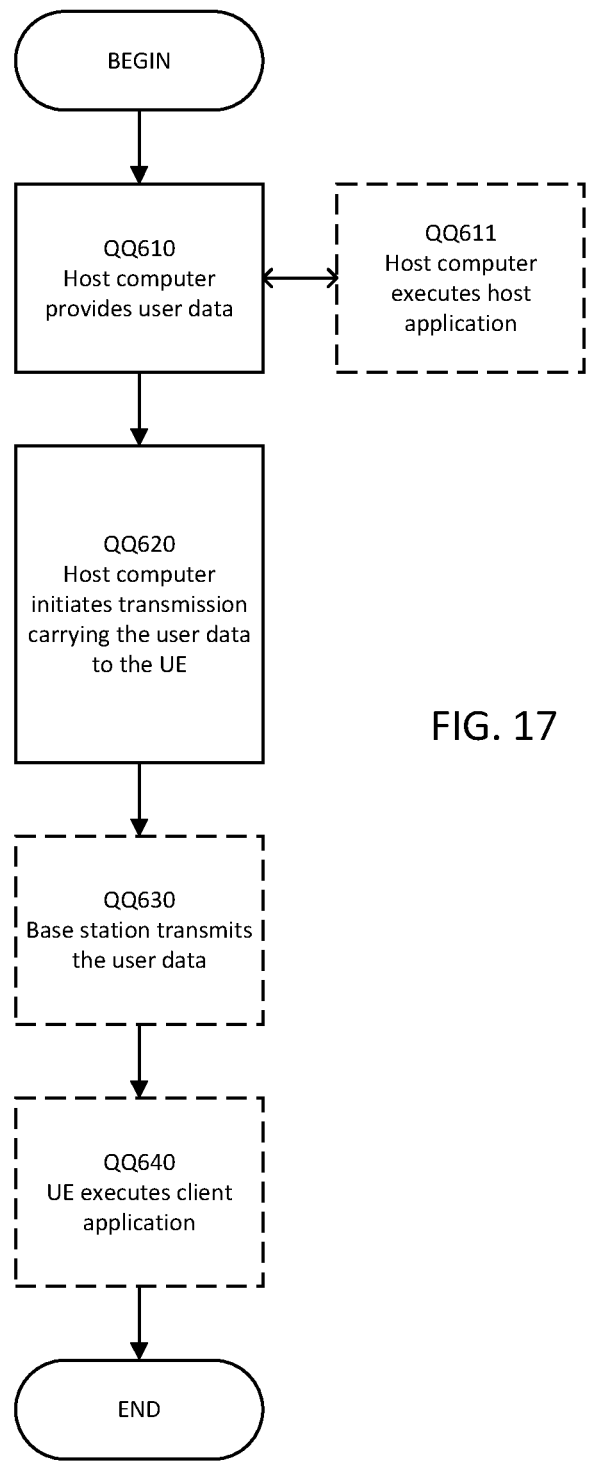
FIG. 17 is a block diagram of methods implemented in a communication system including a host computer, a base station and a user equipment in accordance with some embodiments.

FIG. 17: Methods Implemented in a Communication System Including a Host Computer, a Base Station and a User Equipment in Accordance with Some Embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 18:
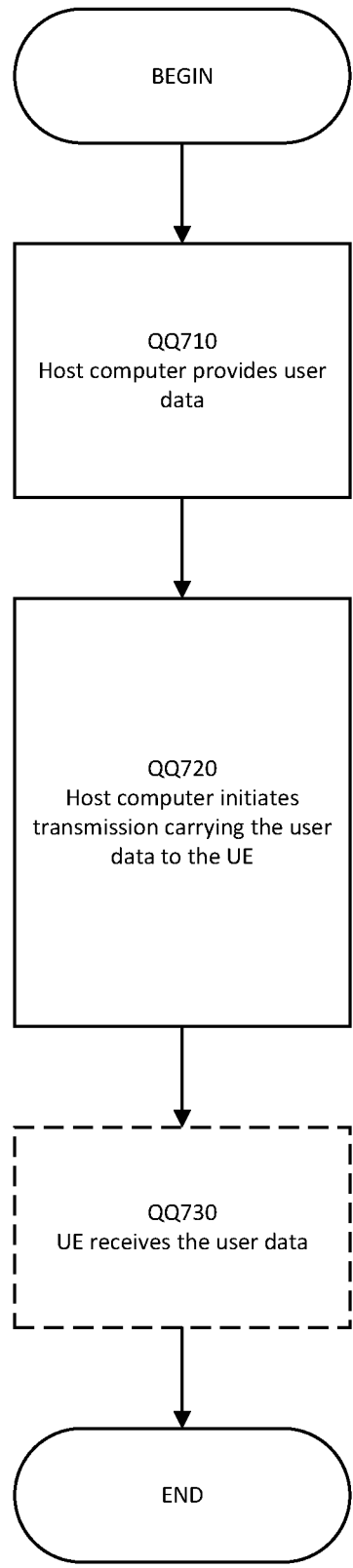
FIG. 18 is a block diagram of methods implemented in a communication system including a host computer, a base station and a user equipment in accordance with some embodiments.

FIG. 18: Methods Implemented in a Communication System Including a Host Computer, a Base Station and a User Equipment in Accordance with Some Embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 19:
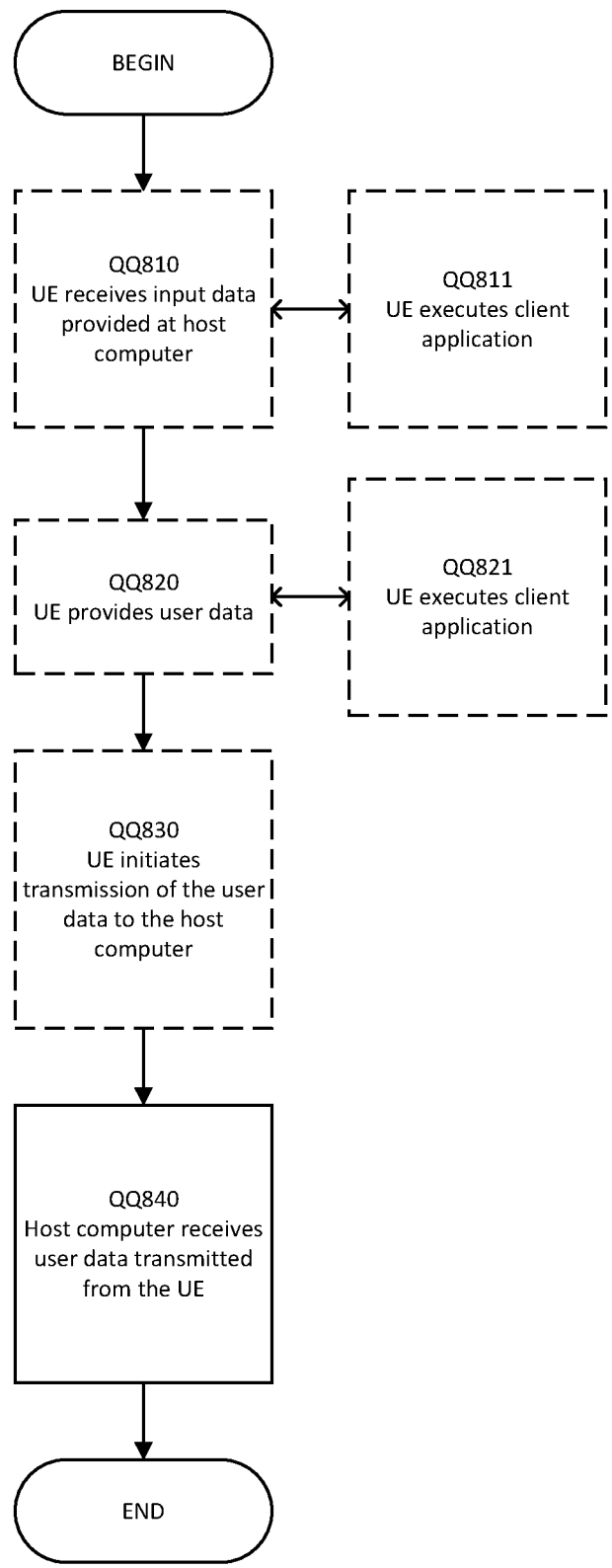
FIG. 19 is a block diagram of methods implemented in a communication system including a host computer, a base station and a user equipment in accordance with some embodiments.

FIG. 19: Methods Implemented in a Communication System Including a Host Computer, a Base Station and a User Equipment in Accordance with Some Embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 20:
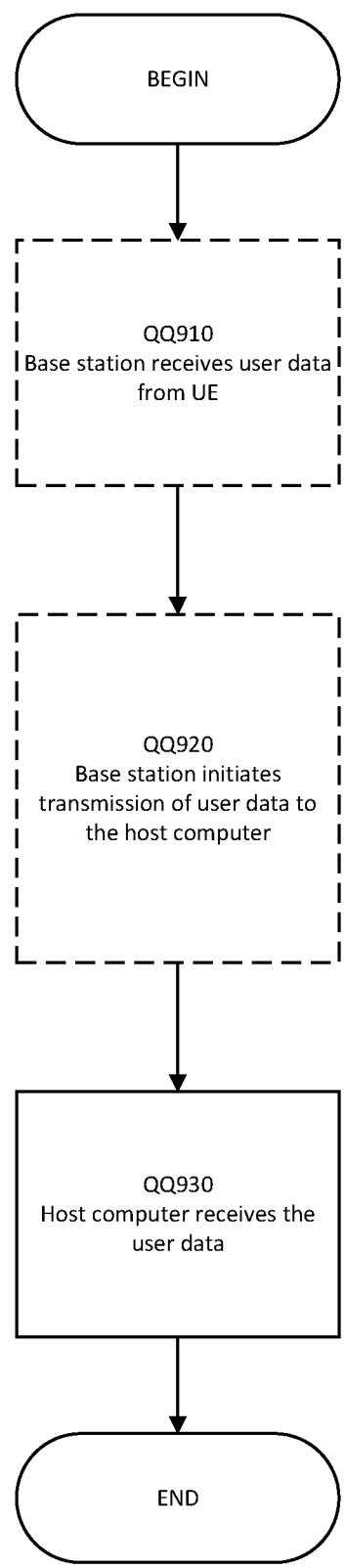
FIG. 20 is a block diagram of methods implemented in a communication system including a host computer, a base station and a user equipment in accordance with some embodiments.

FIG. 20: Methods Implemented in a Communication System Including a Host Computer, a Base Station and a User Equipment in Accordance with Some Embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a wireless terminal (UE) in a radio access network, RAN, the method comprising:
   receiving a request from the RAN to report a cell identifier of a first neighbor cell and a cell identifier of a second neighbor cell;
   starting a timer responsive to receiving the request to report the cell identifier of the first neighbor cell;
   obtaining first system information from the first neighbor cell responsive to receiving the request, wherein the first system information indicates that the first neighbor cell does not broadcast a cell identifier;
   obtaining second system information from the second neighbor cell responsive to receiving the request;
   stopping the timer before expiration of the timer responsive to obtaining the first system information including the indication that the first neighbor cell does not broadcast a cell identifier of the first neighbor cell; and
   transmitting a measurement report to the RAN responsive to obtaining the first system information indicating that the first neighbor cell does not broadcast a cell identifier, wherein the measurement report indicates that the first neighbor cell does not broadcast a cell identifier.

2. The method of claim 1, wherein the timer is associated with the first and second neighbor cells, wherein the second system information indicates that the second neighbor cell does broadcast a cell identifier, and wherein the measurement report indicates that the first neighbor cell does not broadcast a cell identifier and that the second neighbor cell does broadcast a cell identifier.

3. The method of claim 2, wherein the measurement report includes respective empty fields for cell identifiers for the first and second neighbor cells, the method further comprising:
   aborting acquisition of a cell identifier of the second neighbor cell responsive to obtaining the first system information including the indication that the first neighbor cell does not broadcast a cell identifier.

4. The method of claim 1, wherein the timer is a first timer, wherein the measurement report is a first measurement report, and wherein the second system information indicates that the second neighbor cell does broadcast a cell identifier, the method further comprising:
   starting a second timer responsive to receiving the request to report cell identifiers of the first and second neighbor cells; and
   transmitting a second measurement report to the RAN responsive to obtaining the second system information indicating that the second neighbor cell does broadcast a cell identifier, wherein the second measurement report indicates that the second neighbor cell does broadcast a cell identifier.

5. The method of claim 4, wherein transmitting the second measurement report comprises transmitting the second measurement report responsive to failure to acquire a cell identifier of the second neighbor cell before expiration of the second timer and responsive to obtaining the second system information indicating that the second neighbor cell does broadcast a cell identifier, and wherein the first measurement report includes an empty field for the cell identifier for the first neighbor cell and/or the second measurement report includes an empty field for the cell identifier of the second neighbor cell.

6. The method of claim 4, wherein transmitting the second measurement report comprises transmitting the second measurement report responsive to receiving a cell identifier from the second neighbor cell, wherein the second measurement report includes the cell identifier from the second neighbor cell, and wherein the first measurement report includes an empty field for a cell identifier for the first neighbor cell.

7. The method of claim 4, wherein the first measurement report is transmitted before the second measurement report and/or the second measurement report is transmitted after stopping the first timer, and wherein the second timer continues to run after stopping the first timer.

8. The method of claim 1, wherein the timer is associated with the first and second neighbor cells, wherein the second system information indicates that the second neighbor cell does not broadcast a cell identifier, and wherein transmitting the measurement report comprises transmitting the measurement report to the RAN responsive to obtaining the first system information indicating the that first neighbor cell does not broadcast a cell identifier and responsive to obtaining the second system information indicating that the second neighbor cell does not broadcast a cell identifier, wherein the measurement report indicates that the first neighbor cell does not broadcast a cell identifier and that the second neighbor cell does not broadcast a cell identifier.

9. A wireless terminal (UE) comprising:
   a transceiver configured to provide wireless network communication with a radio access network, RAN; and
   a processor coupled with the transceiver, wherein the processor is configured to provide wireless network communication through the transceiver, and wherein the processor is configured to, receive a request from the RAN to report a cell identifier of a first neighbor cell and a cell identifier of a second neighbor cell,
start timer responsive to receiving the request to report the cell identifier,
obtain first system information from the first neighbor cell responsive to receiving the request, wherein the first system information indicates that the first neighbor cell does not broadcast a cell identifier,
obtain second system information from the second neighbor cell responsive to receiving the request,
stop the timer before expiration of the timer responsive to obtaining the first system information including the indication that the first neighbor cell does not broadcast a cell identifier of the first neighbor cell, and
transmit a measurement report to the RAN responsive to obtaining the first system information indicating that the first neighbor cell does not broadcast a cell identifier, wherein the measurement report indicates that the first neighbor cell does not broadcast a cell identifier.

10. The wireless terminal of claim 9, wherein the timer is associated with the first and second neighbor cells, wherein the second system information indicates that the second neighbor cell does broadcast a cell identifier, and wherein the measurement report indicates that the first neighbor cell does not broadcast a cell identifier and that the second neighbor cell does broadcast a cell identifier.

11. The wireless terminal of claim 10, wherein the measurement report includes respective empty fields for cell identifiers for the first and second neighbor cells, wherein the processor is further configured to,
abort acquisition of a cell identifier of the second neighbor cell responsive to obtaining the first system information including the indication that the first neighbor cell does not broadcast a cell identifier.

12. The wireless terminal of claim 9, wherein the timer is a first timer, and wherein the measurement report is a first-measurement report, and wherein the second system information indicates that the second neighbor cell does broadcast a cell identifier, wherein the processor is further configured to,
start a second timer responsive to receiving the request to report cell identifiers of the first and second neighbor cells; and
transmit a second measurement report to the RAN responsive to obtaining the second system information indicating that the second neighbor cell does broadcast a cell identifier, wherein the second measurement report indicates that the second neighbor cell does broadcast a cell identifier.

13. The wireless terminal of claim 12, wherein transmitting the second-measurement report comprises transmitting the second measurement report responsive to failure to acquire a cell identifier of the second neighbor cell before expiration of the second timer and responsive to obtaining the second system information indicating that the second neighbor cell does broadcast a cell identifier, and wherein the first measurement report includes an empty field for the cell identifier for the first neighbor cell and/or the second measurement report includes an empty field for the cell identifier of the second neighbor cell.

14. The wireless terminal of claim 12, wherein transmitting the second measurement report comprises transmitting the second measurement report responsive to receiving a cell identifier from the second neighbor cell, wherein the second measurement report includes the cell identifier from the second neighbor cell, and wherein the first measurement report includes an empty field for a cell identifier for the first neighbor cell.

15. The wireless terminal of claim 12, wherein the first measurement report is transmitted before the second measurement report and/or the second measurement report is transmitted after stopping the first timer, and wherein the second timer continues to run after stopping the first timer.

16. The wireless terminal of claim 9, wherein the timer is associated with the first and second neighbor cells, wherein the second system information indicates that the second neighbor cell does not broadcast a cell identifier, wherein transmitting the measurement report comprises transmitting the measurement report responsive to obtaining the first system information indicating the that first neighbor cell does not broadcast a cell identifier and responsive to obtaining the second system information indicating that the second neighbor cell does not broadcast a cell identifier, and wherein the measurement report indicates that the first neighbor cell does not broadcast a cell identifier and that the second neighbor cell does not broadcast a cell identifier.

17. A method of operating a wireless terminal (UE) in a radio access network, RAN, the method comprising:
receiving from the RAN a request to report respective cell identifiers of first and second neighbor cells;
obtaining first system information from the first neighbor cell responsive to receiving the request, wherein the first system information indicates that the first neighbor cell does not broadcast a cell identifier;
obtaining second system information from the second neighbor cell responsive to receiving the request, wherein second system information indicates that the second neighbor cell does broadcast a cell identifier;
transmitting a first measurement report to the RAN responsive to obtaining the first system information indicating the that first neighbor cell does not broadcast a cell identifier, wherein the first measurement report indicates that the first neighbor cell does not broadcast a cell identifier; and
transmitting a second measurement report to the RAN responsive to obtaining the second system information indicating that the second neighbor cell does broadcast a cell identifier, wherein the second measurement report indicates that the second neighbor cell does broadcast a cell identifier.

18. The method of claim 17 further comprising:
starting a timer responsive to receiving the request to report the cell identifiers of the first and second neighbor cells;
acquiring the cell identifier of the second neighbor cell responsive to obtaining the second system information indicating that the second neighbor cell does broadcast the cell identifier;
wherein the second measurement report includes the cell identifier of the second neighbor cell responsive to acquiring the cell identifier of the second neighbor cell before expiration of the timer.

19. The method of claim 18, wherein the timer is a T321 timer.

20. The method of claim 17 further comprising:
starting a timer responsive to receiving the request to report the cell identifiers of the first and second neighbor cells;
wherein the second measurement report includes an empty field for the cell identifier of the second neighbor cell responsive to failure to acquire the cell identifier of the second neighbor cell before expiration of the timer.

21. The method of claim 20, wherein the timer is a T321 timer.

22. The method of claim 17, wherein the request from the RAN includes a first cell identifier of the first neighbor cell and the cell identifier of the first neighbor cell is a second cell identifier of the first neighbor cell different than the first identifier, wherein the request from the RAN includes a third cell identifier of the second neighbor cell and the cell identifier of the second neighbor cell is a fourth cell identifier of the second neighbor cell different than the third identifier, and wherein the first and third identifiers are respective first and third physical cell identifiers, PCIs, and the second and fourth cell identifiers are respective cell global identifiers, CGIs.

23. The method of claim 17, wherein the request from the RAN identifies respective frequencies used by the first and second neighbor cells, and wherein obtaining the first and second system information comprises obtaining the first and second system information based on the respective frequencies used by the first and second neighbor cells.

24. A wireless terminal (UE) comprising:
a transceiver configured to provide wireless network communication with a radio access network, RAN; and
a processor coupled with the transceiver, wherein the processor is configured to provide wireless network communication through the transceiver, and wherein the processor is configured to,
receive from the RAN a request to report respective cell identifiers of first and second neighbor cells,
obtain first system information from the first neighbor cell responsive to receiving the request, wherein the first system information indicates that the first neighbor cell does not broadcast a cell identifier,
obtain second system information from the second neighbor cell responsive to receiving the request, wherein second system information indicates that the second neighbor cell does broadcast a cell identifier,
transmit a first measurement report to the RAN responsive to obtaining the first system information indicating the that first neighbor cell does not broadcast a cell identifier, wherein the first measurement report indicates that the first neighbor cell does not broadcast a cell identifier, and
transmit a second measurement report to the RAN responsive to obtaining the second system information indicating that the second neighbor cell does broadcast a cell identifier, wherein the second measurement report indicates that the second neighbor cell does broadcast a cell identifier.

25. The wireless terminal of claim 24, wherein the processor is further configured to,
start a timer responsive to receiving the request to report the cell identifiers of the first and second neighbor cells, and
acquire the cell identifier of the second neighbor cell responsive to obtaining the second system information indicating that the second neighbor cell does broadcast the cell identifier;
wherein the second measurement report includes the cell identifier of the second neighbor cell responsive to acquiring the cell identifier of the second neighbor cell before expiration of the timer.

26. The wireless terminal of claim 25, wherein the timer is a T321 timer.

27. The wireless terminal of claim 24, wherein the processor is further configured to,
start a timer responsive to receiving the request to report the cell identifiers of the first and second neighbor cells;
wherein the second measurement report includes an empty field for the cell identifier of the second neighbor cell responsive to failure to acquire the cell identifier of the second neighbor cell before expiration of the timer.

28. The wireless terminal of claim 27, wherein the timer is a T321 timer.

29. The wireless terminal of claim 24, wherein the request from the RAN includes a first cell identifier of the first neighbor cell and the cell identifier of the first neighbor cell is a second cell identifier of the first neighbor cell different than the first identifier, wherein the request from the RAN includes a third cell identifier of the second neighbor cell and the cell identifier of the second neighbor cell is a fourth cell identifier of the second neighbor cell different than the third identifier, and wherein the first and third identifiers are respective first and third physical cell identifiers, PCIs, and the second and fourth cell identifiers are respective cell global identifiers, CGIs.

30. The wireless terminal of claim 24, wherein the request from the RAN identifies respective frequencies used by the first and second neighbor cells, and wherein obtaining the first and second system information comprises obtaining the first and second system information based on the respective frequencies used by the first and second neighbor cells.

* * * * *